(12) United States Patent
Yoon et al.

(10) Patent No.: US 10,598,935 B2
(45) Date of Patent: Mar. 24, 2020

(54) HYBRID LENS WITH A SILICONE FRESNEL SURFACE

(71) Applicant: Facebook Technologies, LLC, Menlo Park, CA (US)

(72) Inventors: Youngshik Yoon, Cupertino, CA (US); Richard Han Soo Cho, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 451 days.

(21) Appl. No.: 15/432,793

(22) Filed: Feb. 14, 2017

(65) Prior Publication Data

US 2018/0231777 A1    Aug. 16, 2018

(51) Int. Cl.
| | | |
|---|---|---|
| *G02B 27/01* | (2006.01) | |
| *G02B 3/08* | (2006.01) | |
| *B29D 11/00* | (2006.01) | |
| *B29K 83/00* | (2006.01) | |

(52) U.S. Cl.
CPC .... *G02B 27/0172* (2013.01); *B29D 11/00269* (2013.01); *B29D 11/00403* (2013.01); *B29D 11/00442* (2013.01); *G02B 3/08* (2013.01); *G02B 27/0176* (2013.01); *B29K 2083/00* (2013.01); *G02B 2027/011* (2013.01); *G02B 2027/0152* (2013.01); *G02B 2027/0178* (2013.01)

(58) Field of Classification Search
CPC ...... G02B 3/08; G02B 5/1876; G02B 5/1889; G02B 5/1895; G02B 7/02–028; G02B 27/01; G02B 27/017; G02B 27/0172; G02B 27/0176; G02B 2027/011; G02B 2027/0152; G02B 2027/0178; B29K 2083/00; B29D 11/00269; B29D 11/00403; B29D 11/00442

USPC .......................................................... 359/743
See application file for complete search history.

(56) References Cited

U.S. PATENT DOCUMENTS

| | | | | |
|---|---|---|---|---|
| 8,714,783 | B2 * | 5/2014 | Lee ........................... | F21V 5/04 362/311.09 |
| 9,553,227 | B2 * | 1/2017 | Abe ......................... | G02B 3/08 |
| 10,180,234 | B2 * | 1/2019 | Yamazaki ................. | F21V 5/00 |
| 2007/0279911 | A1 * | 12/2007 | Kittelmann ............. | F21L 4/005 362/328 |
| 2011/0030765 | A1 * | 2/2011 | Yang ........................ | F24S 23/31 136/246 |

* cited by examiner

*Primary Examiner* — William R Alexander
(74) *Attorney, Agent, or Firm* — Morgan, Lewis & Bockius LLP

(57) ABSTRACT

A method for making a hybrid lens includes providing, in a mold having a first Fresnel pattern, (i) a first lens and (ii) a silicone material comprising silicone and curing the silicone material in the mold to form a hybrid Fresnel lens. The cured silicone material is mechanically coupled with the first lens; and the cured silicone material has a second Fresnel pattern that corresponds to the first Fresnel pattern. A hybrid lens made by this method is also described. A hybrid lens includes a first lens mechanically coupled with a cured silicone material. The cured silicone material has a Fresnel pattern on a surface that faces away from the first lens.

9 Claims, 27 Drawing Sheets

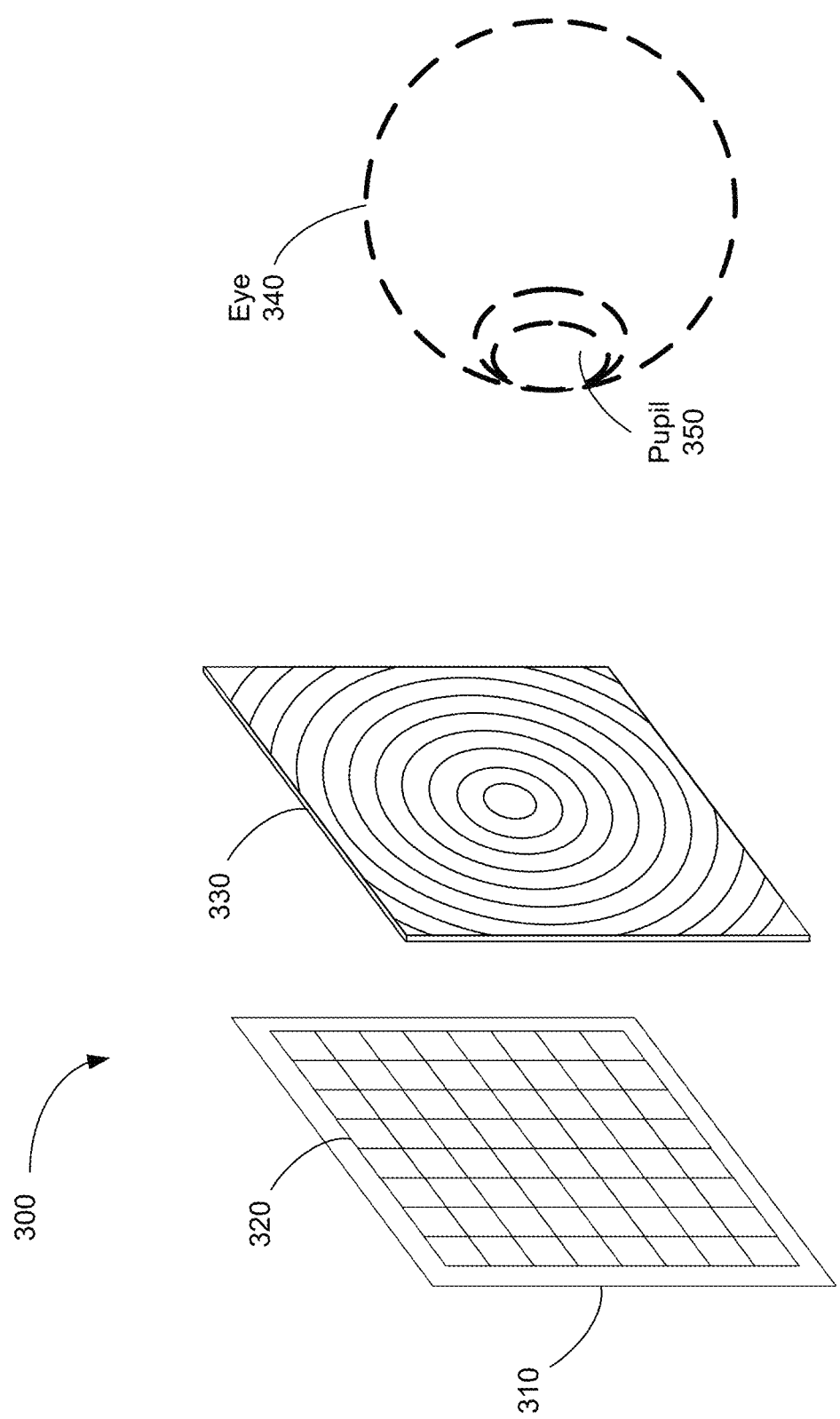

HYBRID LENS WITH A SILICONE FRESNEL SURFACE

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from optical artifacts associated with Fresnel pattern, and thus, the use of Fresnel lenses in imaging applications is limited.

Thus, there is a need for lenses that are compact, rigid and light while maintaining the quality of projected images.

The above deficiencies and other problems associated with conventional lenses are reduced or eliminated by the disclosed hybrid Fresnel lens. In some embodiments, the hybrid Fresnel lens is included in a display device. In some embodiments, the device is a head-mounted display device. In some embodiments, the device is portable.

In accordance with some embodiments, a hybrid Fresnel lens includes a first lens mechanically coupled with a cured silicone material comprising silicone. The silicone material has a Fresnel pattern on a surface that faces away from the first lens.

In accordance with some embodiments, a method of making a hybrid Fresnel lens includes providing a first lens and a silicone material comprising silicone in a mold which has a Fresnel pattern, and curing the silicone material in the mold to form a hybrid Fresnel lens. The cured silicone material is mechanically coupled with the first lens, and the cured silicone material has a Fresnel pattern that corresponds to the Fresnel pattern of the mold.

In accordance with some embodiments, a hybrid Fresnel lens made by the process described herein is provided.

In accordance with some embodiments, a lens assembly includes a first lens and a second lens slidably coupled with the first lens. The second lens includes silicone material comprising silicone and has a surface with a Fresnel pattern.

In accordance with some embodiments, a method of making a lens assembly includes providing a first lens, providing a second lens that includes a silicone material comprising silicone and has a Fresnel pattern, and slidably coupling the first lens with the second lens.

In accordance with some embodiments, a display device includes the lens assembly and an array of light emitting devices coupled with the lens for outputting light through the lens assembly Thus, the disclosed embodiments provide compact and light lenses and lens assemblies that provide high quality images, and methods of making such lenses and lens assemblies.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
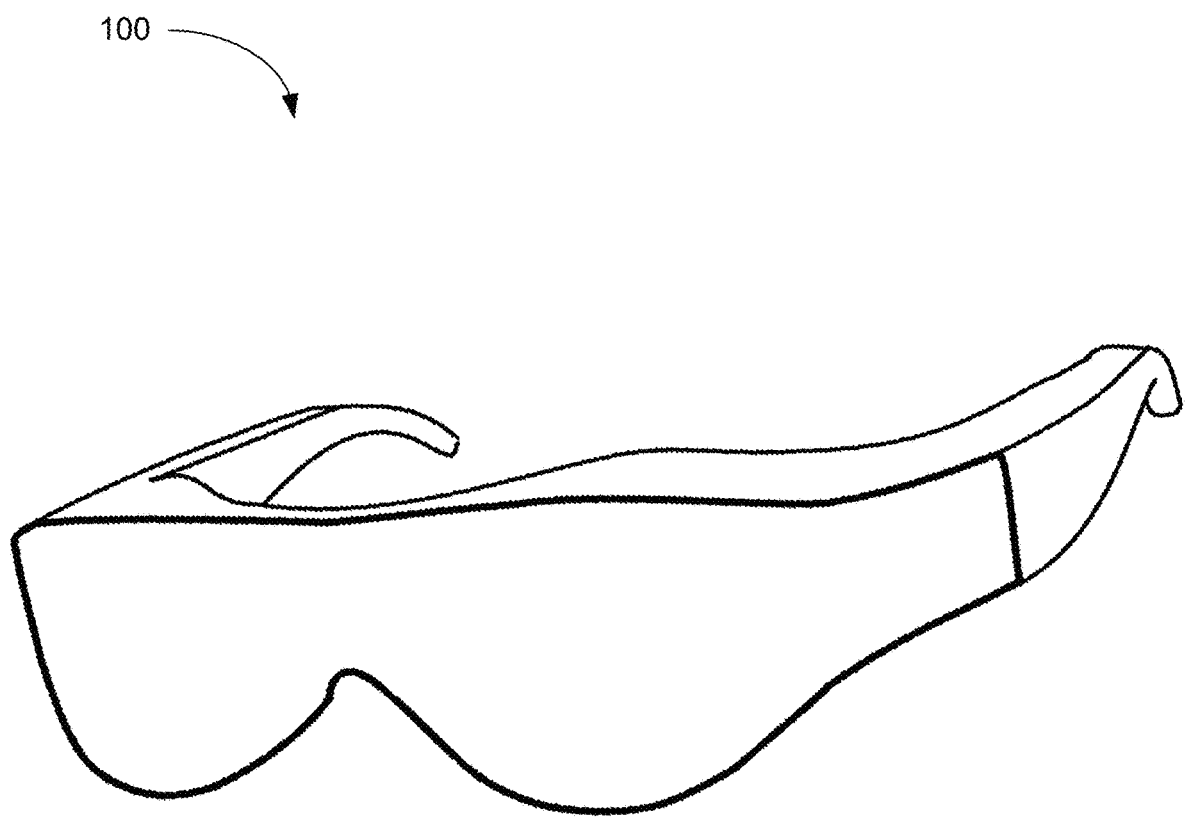
FIG. 1 is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays.

Fresnel lenses, having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other stray light artifacts associated with Fresnel structures, and thus, their use in imaging applications is limited.

In particular, a Fresnel lens of a high optical power often has a high thickness (e.g., a Fresnel lens has a convex non-Fresnel surface and/or a Fresnel surface having a convex baseline). Thus, manufacturing such high power Fresnel lens typically requires a long cycle time due to a long injection step and/or a long cooling step.

A hybrid Fresnel lens described herein utilizes a preformed lens in an insert molding process so that the cycle time for making the hybrid Fresnel lens is reduced.

In addition, the Fresnel surface of the hybrid Fresnel lens is made with a silicone material comprising silicone, so optical artifacts caused by conventional Fresnel lenses are reduced. For example, Fresnel lenses made by a conventional injection molding process have a certain draft angle to allow extraction of such lenses from the mold. However, the draft surfaces contribute to optical artifacts. In the disclosed methods and lenses, a reduced draft angle is used, thereby reducing the optical artifacts associated with the Fresnel surface.

Furthermore, the disclosed hybrid Fresnel lens has a high rigidity, which is needed for providing a stable performance in an optical system (e.g., a display device).

The disclosed embodiments provide hybrid Fresnel lenses that are compact, rigid and light, and cause reduced optical artifacts. Methods for making such hybrid Fresnel lenses are also disclosed.

The disclosed embodiments also provide lens assemblies that combine a conventional lens and a silicone Fresnel lens (e.g., a Fresnel lens comprising silicone). A spacing between the conventional lens and the silicone Fresnel lens can be adjusted to provide a particular magnification.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lenses.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
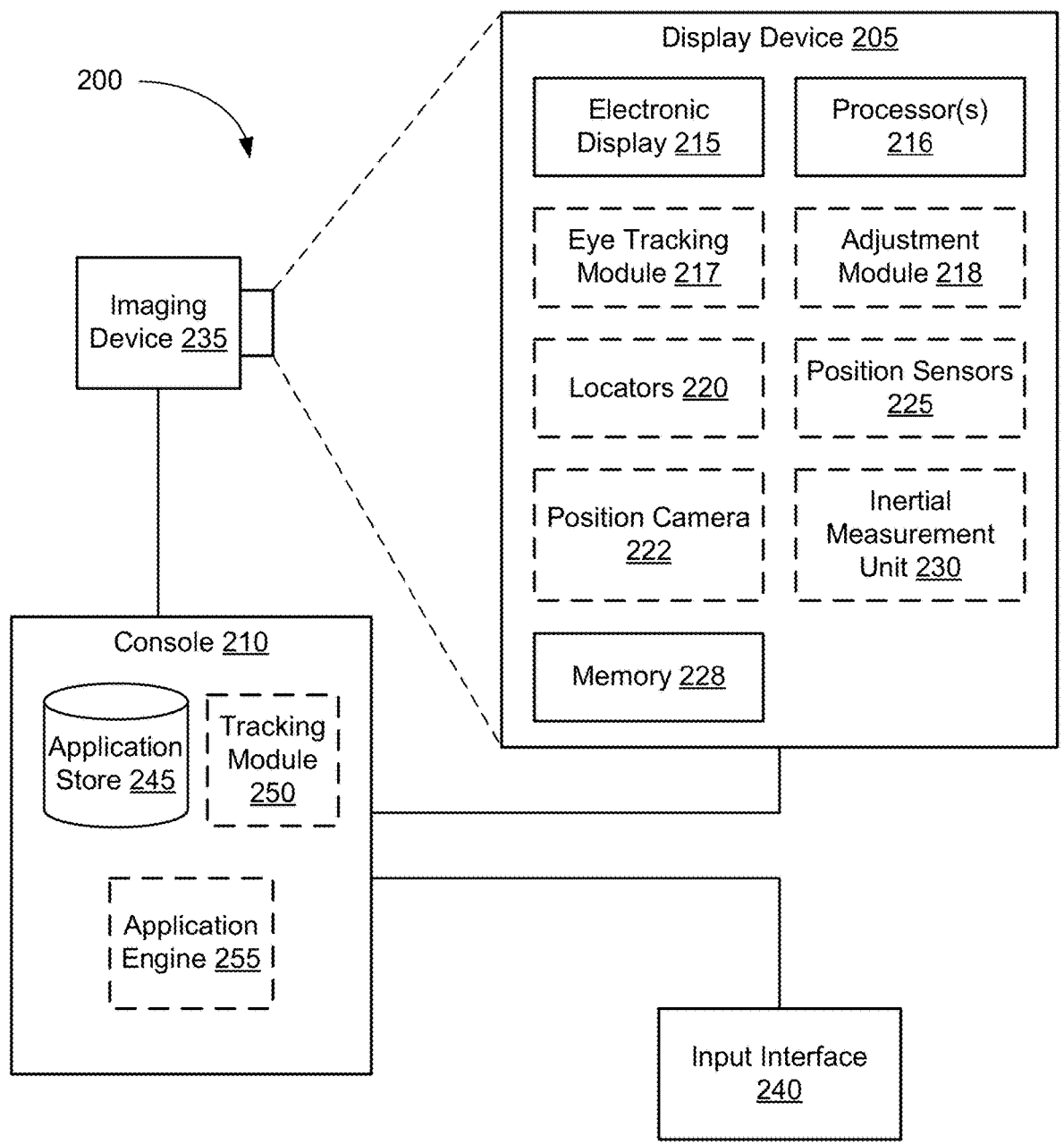
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330 (e.g., a hybrid Fresnel lens or a lens assembly). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330 (e.g., a hybrid Fresnel lens or a lens assembly). In some embodiments, display device 300 uses the emission intensity array to facilitate providing image light to a location of pupil 350 of eye 340 of a user, and minimize the amount of image light provided to other areas in the eyebox.

One or more lenses 330 (e.g., a hybrid Fresnel lens or a lens assembly) receive the modified image light (e.g., attenuated light) from the emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 (e.g., a hybrid Fresnel lens or a lens assembly) toward the determined location of pupil 350, and not toward other locations in the eyebox.

FIGS. 4A to 4H are schematic diagrams showing hybrid Fresnel lenses in accordance with some embodiments.

Figure 4A:
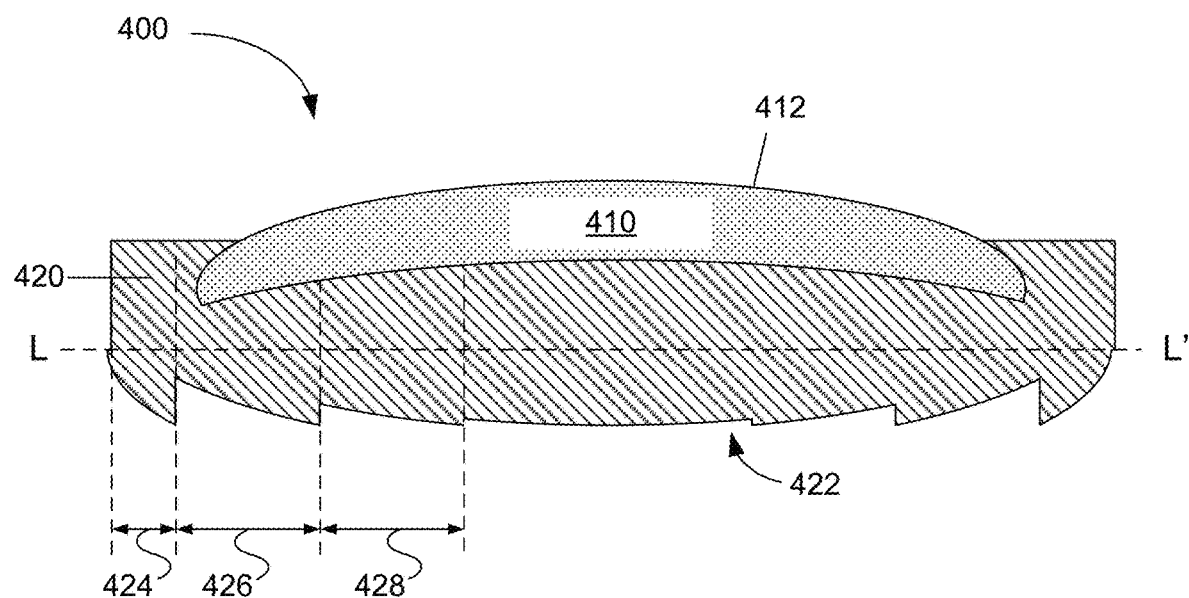
FIG. 4A is a schematic diagram illustrating a cross-sectional view of a hybrid Fresnel lens in accordance with some embodiments.

Hybrid Fresnel lens 400 shown in FIG. 4A has first lens 410 mechanically coupled with a cured silicone material 420. The cured silicone material has Fresnel pattern 422. In FIG. 4A, Fresnel pattern 422 of the cured silicone material has a planar baseline (represented by reference line LL'). Alternatively, the Fresnel pattern of the cured silicone material has a convex baseline (represented by reference line MM' shown in FIG. 4C).

Figure 4B:
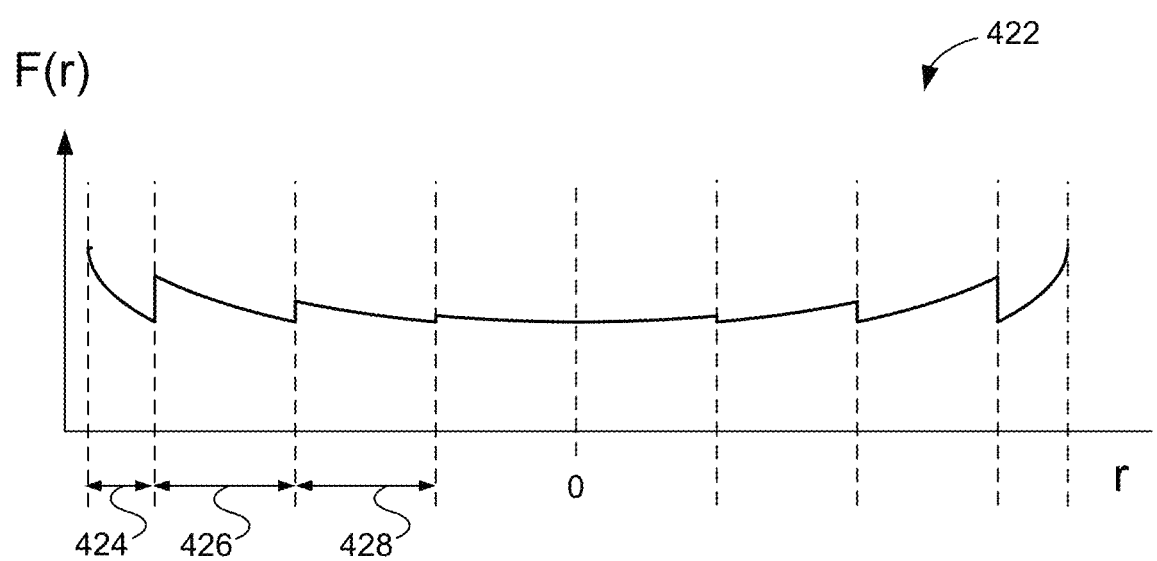
FIG. 4B is a schematic diagram illustrating a Fresnel pattern of FIG. 4A.
Figure 4C:
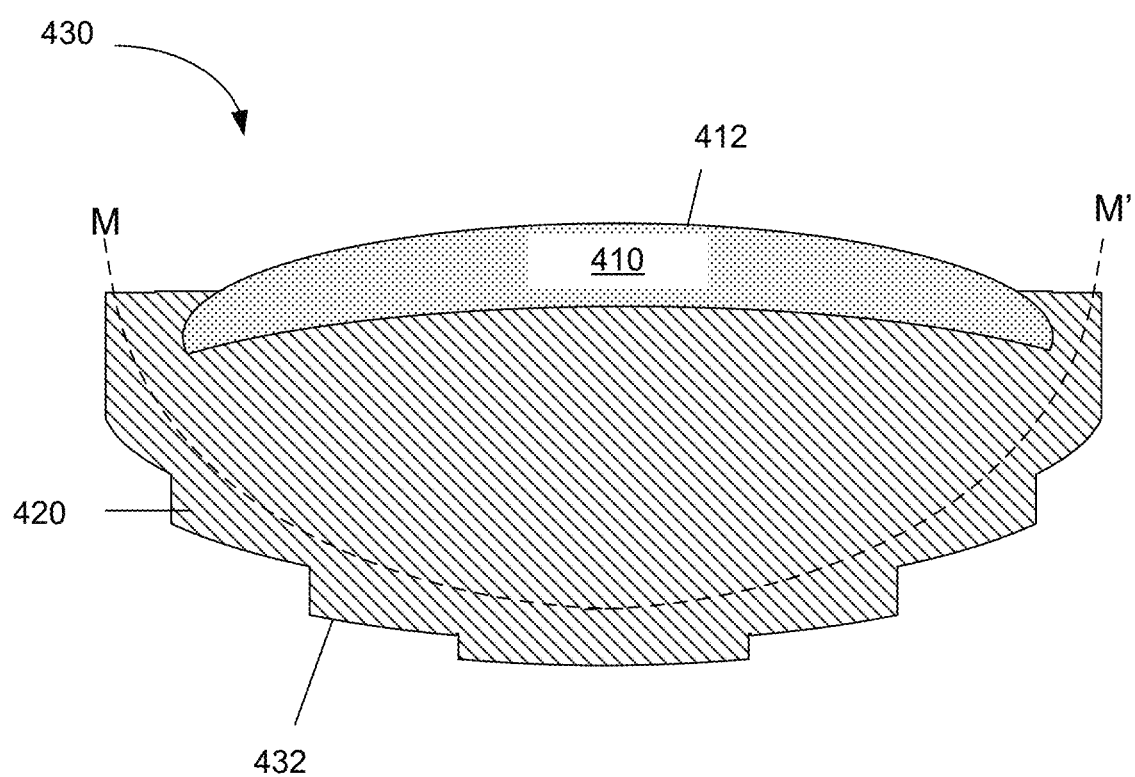
FIG. 4C is a schematic diagram illustrating a cross-sectional view of a hybrid Fresnel lens in accordance with some embodiments.

For illustration purposes, Fresnel pattern 422 in FIG. 4A is divided into sections 424, 426 and 428 (e.g., annular regions of a Fresnel surface). In some embodiments, Fresnel pattern 422 is defined by a surface profile function. For example, the surface profile function is defined as a function of a radial position r, such as F(r), as shown in FIG. 4B. In FIG. 4B, a derivative of the surface profile function has one or more discontinuities (e.g., a derivative of the surface profile function has a discontinuity at a junction of section 424 and section 426 and a discontinuity at a junction of section 426 and section 428 at least due to the draft surfaces).

In some embodiments, Fresnel pattern 422 has a draft angle that is less than 0.5° (e.g., 0.4°, 0.3°, 0.2°, or 0.1°). In some embodiments, Fresnel pattern 422 has a zero draft angle.

Figure 4D:
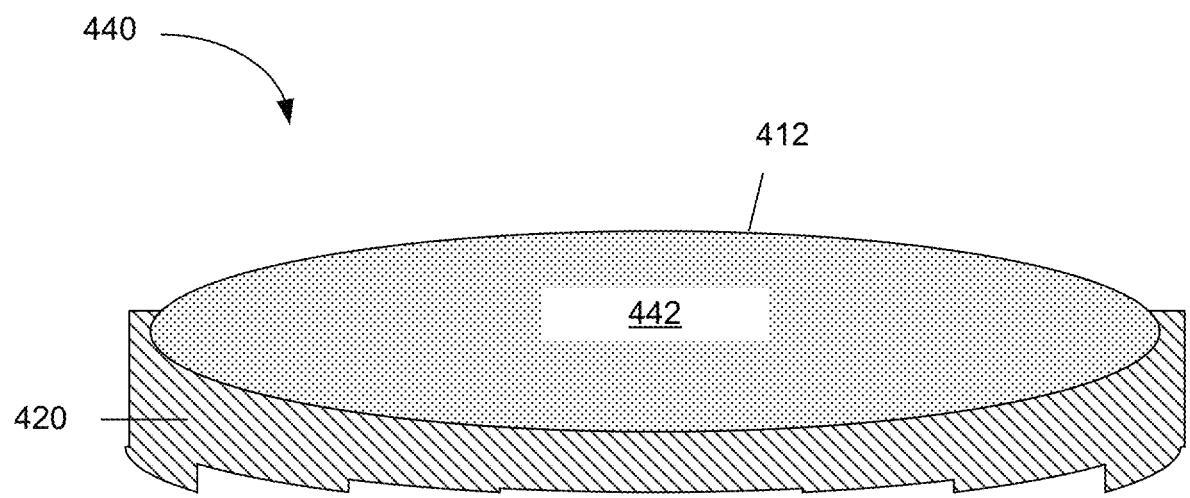
FIG. 4D is a schematic diagram illustrating a cross-sectional view of a hybrid Fresnel lens in accordance with some embodiments.
Figure 4E:
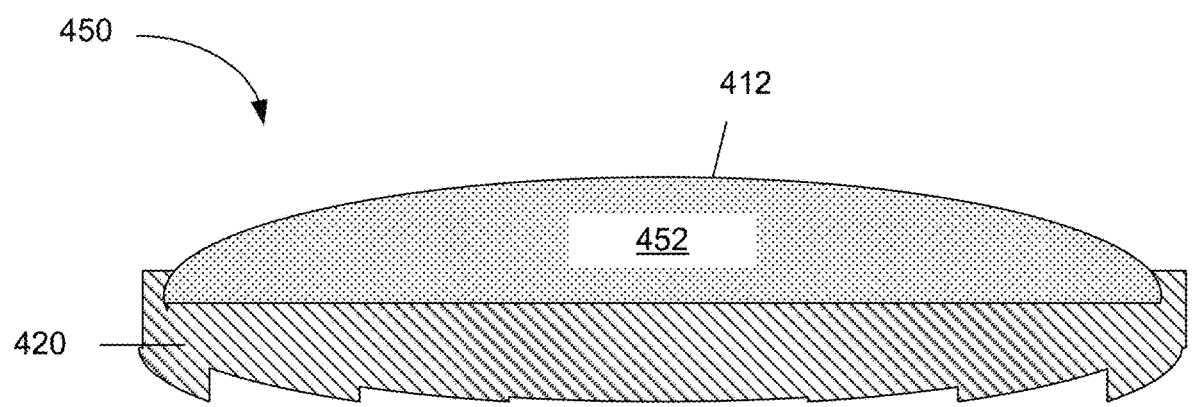
FIG. 4E is a schematic diagram illustrating a cross-sectional view of a hybrid Fresnel lens in accordance with some embodiments.

In some embodiments, the first lens has a convex surface facing away from the silicone material. For example, first lens 410 (e.g., FIGS. 4A and 4C) have a convex-concave shape with convex surface 412 facing away from the silicone material (e.g., cured silicone rubber 420). FIG. 4D shows hybrid Fresnel lens 440 with convex-convex shaped first lens 442. Convex-convex shaped first lens 442 has first convex surface 412 facing away from cured silicone material 420. FIG. 4E shows hybrid Fresnel lens 450 with plano-convex shaped first lens 452. Plano-convex shaped first lens 452 has convex surface 412 facing away from cured silicone material 420.

In some embodiments, the first lens has a convex surface facing the silicone material. For example, first lens 442 also has a second convex surface, opposite to first convex surface 412, facing cured silicone material 420.

In some embodiments, the first lens has one or more surfaces, facing the silicone material, that are not convex surfaces (e.g., the first lens has a non-convex surface facing the silicone material). For example, FIG. 4A shows lens 410 with a concave surface facing silicone material 420. FIG. 4E shows lens 452 with a plano surface facing cured silicone material 420.

Figure 4F:
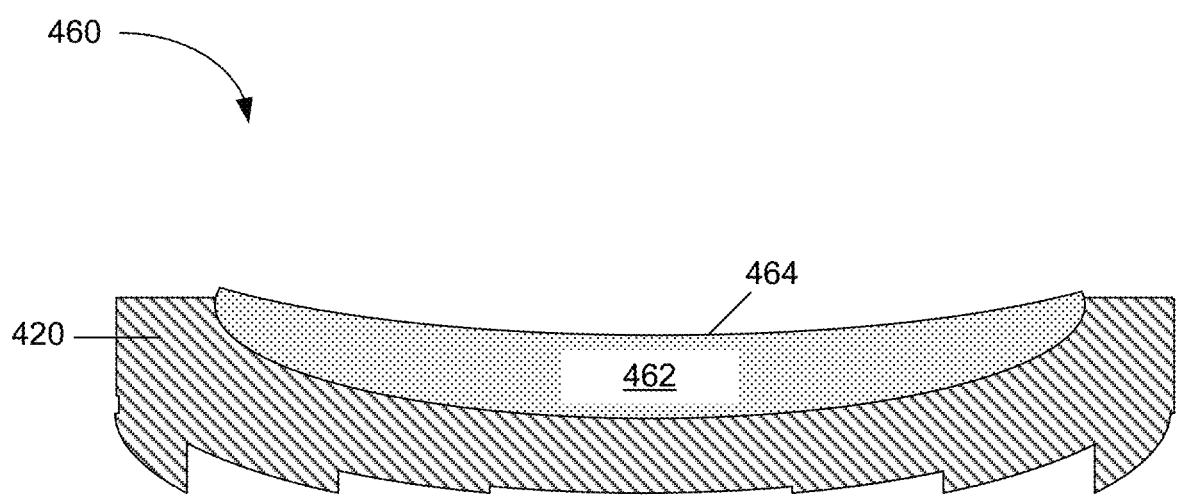
FIG. 4F is a schematic diagram illustrating a cross-sectional view of a hybrid Fresnel lens in accordance with some embodiments.

In some embodiments, the first lens has one or more concave surfaces facing away from the silicone material (e.g., the first lens has a concave surface facing away from the silicone material). For example, FIG. 4F shows hybrid Fresnel lens 460 with concave-convex shaped first lens 462. Concave-convex shaped first lens 462 has concave surface 464 facing away from cured silicone material 420.

Figure 4G:
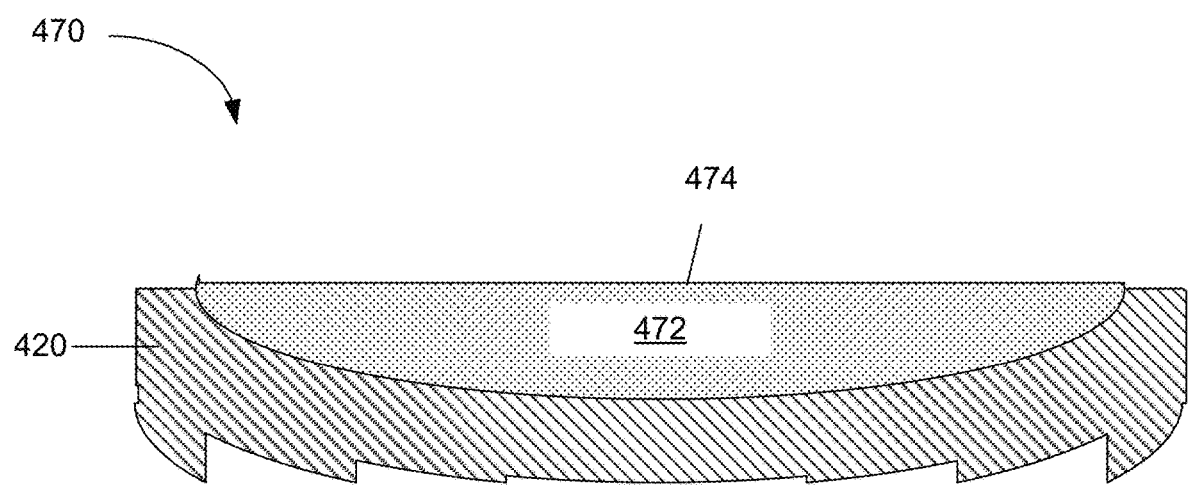
FIG. 4G is a schematic diagram illustrating a cross-sectional view of a hybrid Fresnel lens in accordance with some embodiments.

In some embodiments, the first lens has a planar surface facing away from the silicone material. FIG. 4G shows hybrid Fresnel lens 470 with plano-convex shaped first lens 472. Plano-convex shaped first lens 472 has planar surface 474 facing away from cured silicone material 420.

Figure 4H:
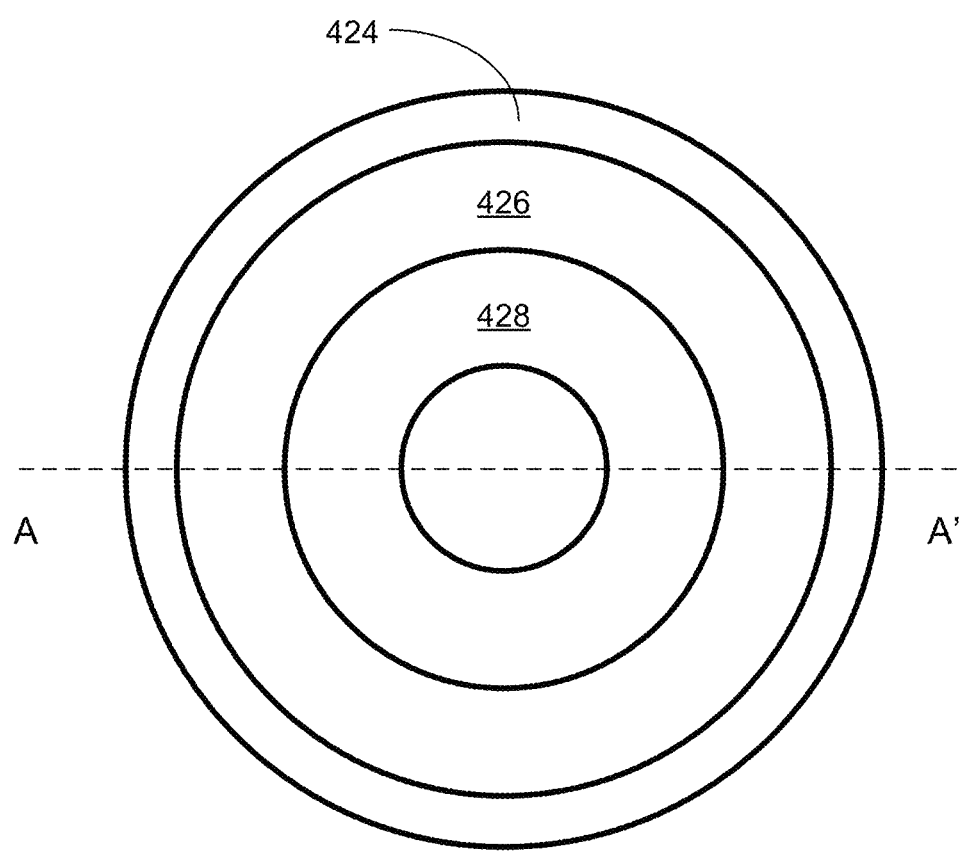
FIG. 4H is a schematic diagram illustrating a plan view of a hybrid Fresnel lens of in accordance with some embodiments.

FIG. 4H is a schematic diagram illustrating a plan view of a hybrid Fresnel lens. Line AA' on the plan view represents a plane upon which the cross-sectional view of FIGS. 4A and 4C to 4G is taken. In some embodiments, the hybrid Fresnel lens is rotationally symmetric, as shown in FIG. 4H (e.g., the hybrid Fresnel lens is a circular lens). In some embodiments, the hybrid Fresnel lens is reflectionally symmetric, but not rotationally symmetric (e.g., the hybrid Fresnel lens is a cylindrical lens).

In some embodiments, the display device shown in FIG. 3 includes one or more of the hybrid Fresnel lenses shown in FIGS. 4A-4H (e.g., lens 330 shown in FIG. 3 corresponds to hybrid Fresnel lenses shown in one of FIGS. 4A to 4H).

In some embodiments, the silicone material includes silicone. In some embodiments, the silicone material is made of a material including silicone. In some embodiments, the silicone material is made of silicone. In some embodiments, the silicone material also includes one or more fillers. In some embodiments, the silicone material is a silicone rubber. In some embodiments, the silicone is a liquid silicone rubber. In some embodiments, the silicone rubber is silicone rubber gel. In some embodiments, the silicone material is a silicone resin. In some embodiments, the silicone material is silicone gel (in an uncured state). In some embodiments, the silicone material is liquid silicone (in an uncured state). In some embodiments, the cured silicone rubber is transparent. In some embodiments, the cured silicone material is transparent. In some embodiments, the silicone material (e.g., silicone rubber or silicone resin) has a shore A hardness between 10 and 90. In some embodiments, the silicone material has a tensile strength between 1.3 and 10.4 MPa. In some embodiments, the silicone material has a tensile strength between 2.4 and 5.5 MPa. In some embodiments, the silicone material has a Young's modulus between 0.001 and 0.05 GPa. In some embodiments, the silicone material is polysiloxane. In some embodiments, the silicone material is polydimethylsiloxane (PDMS). In some embodiments, the silicone material includes organopolysiloxane and/or organohydrogenpolysiloxane.

In some embodiments, first lens 410 is made of a material including polymethylmethacrylate (PMMA, also known as acrylic). In some embodiments, the first lens is made of PMMA. PMMA lenses are light and rigid.

The first lens and the cured silicone material are mechanically coupled. In some embodiments, the first lens is partially embedded in the cured silicone material, as shown in FIGS. 4A, and 4C to 4G. In some embodiments, 90% of more of the first convex surface is not covered by the cured silicone material (e.g., FIG. 4A). In some embodiments, the first convex surface is defined by a surface profile function (e.g., a spherical surface or a non-spherical surface, such as a paraboloidal surface), and a derivative of the surface profile function has no discontinuity for at least a portion of the first convex surface that is not covered by the cured silicone material.

The hybrid Fresnel lens combines the rigidity and support provided by the conventional first lens with an improved optical performance provided by a Fresnel patterned lens made of silicone material.

FIGS. 5A-5D illustrate a method for making a hybrid Fresnel lens in accordance with some embodiments. FIGS. 5A-5D illustrate a method for making hybrid Fresnel lens 400, but a similar method can be used for making any hybrid Fresnel lens.

Figure 5A:
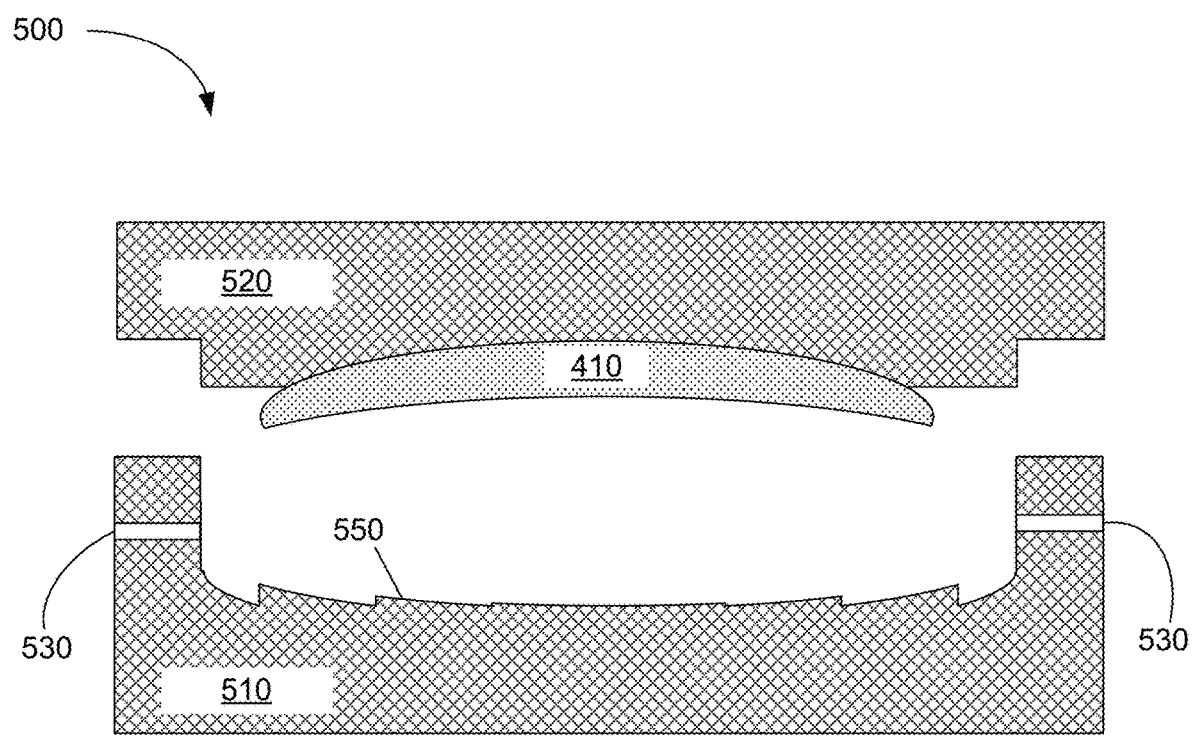
FIG. 5A is a schematic diagram illustrating a cross-sectional view of a molding system for making a hybrid Fresnel lens in accordance with some embodiments.

FIG. 5A is a schematic diagram illustrating a cross-sectional view of a mold system 500 including first mold 510 and second mold 520. FIG. 5A shows mold system 500 in an open configuration (e.g., first mold 510 and second mold 520 are separated from each other). In some embodiments, first mold 510 and second mold 520 are coupled with each other by means that allow transferring first and second molds 510 and 520 between an open configuration and a closed configuration (e.g., transferring first and second molds 510 and 520 from an open configuration to a closed configuration and back). A first lens (e.g., lens 410) is mounted on (e.g., removably attached to) second mold 520. In FIG. 5A, first lens 410 with a convex-concave shape is shown. Alternatively, the first lens may be any of the first lenses described herein (e.g., the first lenses shown in FIGS. 4D-4G. First lens 410 is mounted on second mold 520 by means known in the art that allows attachment and separation of first lens 410 from second mold 520.

Figure 5B:
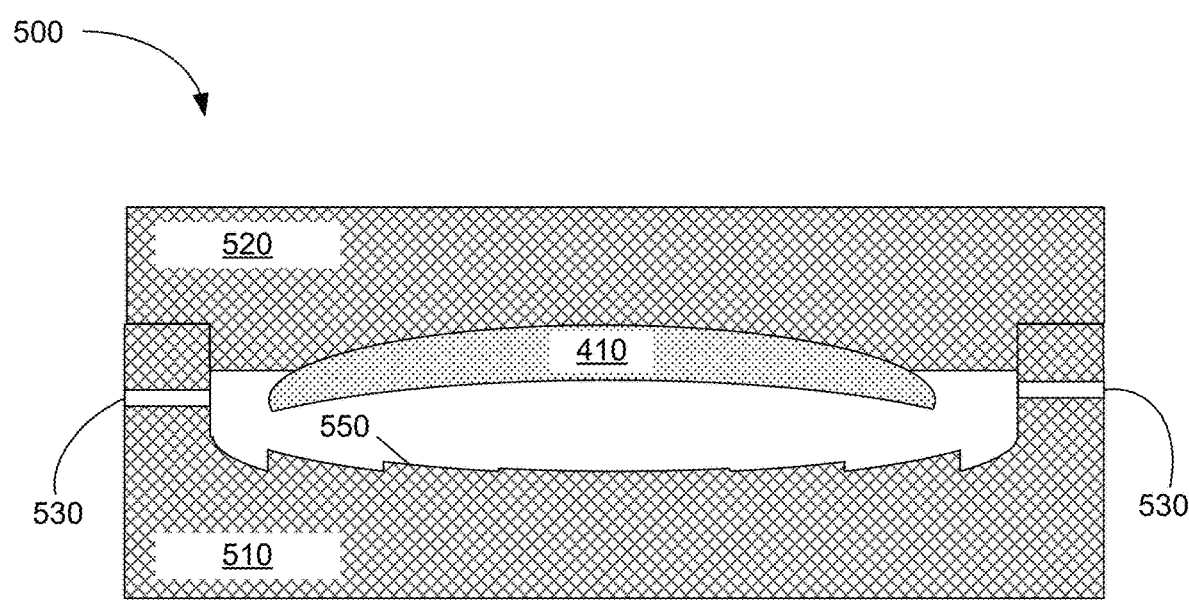
FIG. 5B is a schematic diagram illustrating a cross-sectional view of the molding system of FIG. 5A in a closed configuration.

In some embodiments, one or more channels 530 are defined in first mold 510 for providing material (e.g., liquid silicone rubber or silicone rubber gel) into first mold 510 while first mold 510 is in closed configuration as shown in FIG. 5B. In FIG. 5A, two channels 530 are shown. However, more or fewer channels can be used. First mold 510 has a patterned surface. The patterned surface has first Fresnel pattern 550, for the purpose of providing a Fresnel patterned structure in the molded article (e.g., a molded lens). First Fresnel pattern 550 is defined by a surface profile function and a derivative of the surface profile function has one or more discontinuities (as explained above with respect to FIG. 4B).

FIG. 5B shows mold system 500 in a closed configuration. First lens 410 is positioned inside mold system 500 (e.g., first lens 410 is located within a space defined by first mold 510 and second mold 520). In some embodiments, first lens 410 lies above first mold 510. In some embodiments, first lens 410 is centered above first Fresnel pattern 550 (e.g., a center of first lens 410 is aligned with a center of first Fresnel pattern 550).

Figure 5C:
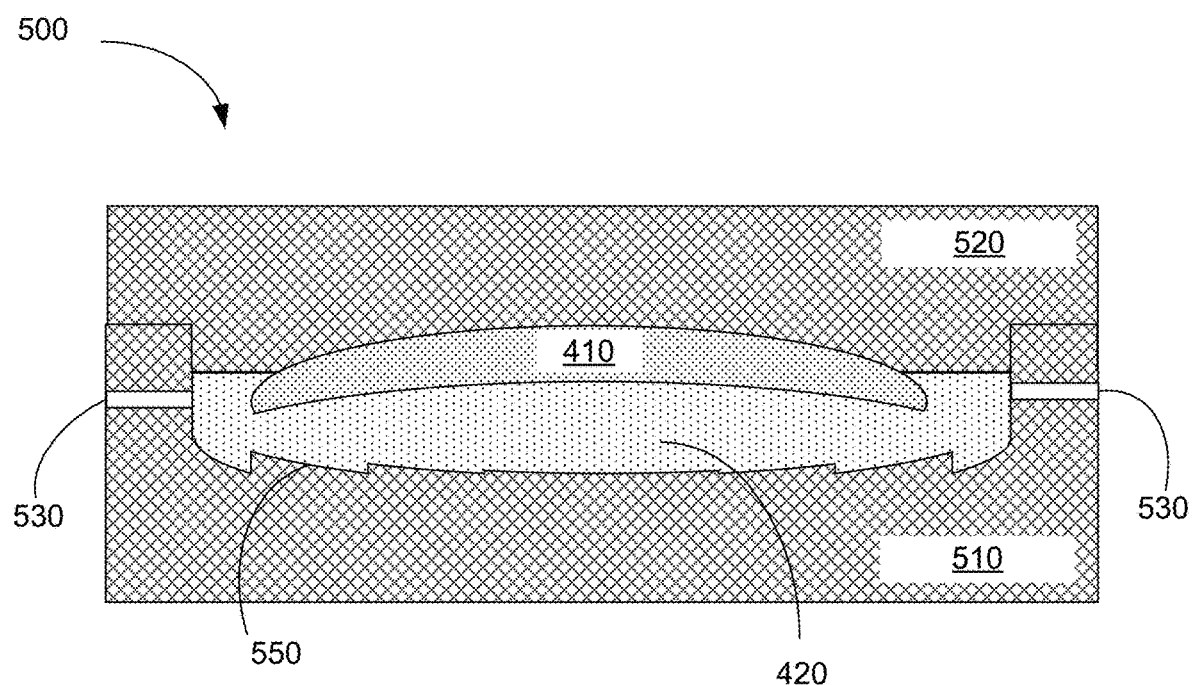
FIG. 5C is a schematic diagram illustrating a cross-sectional view of the molding system of FIG. 5A during curing of silicone material.

Moving to FIG. 5C, silicone material 420, such as a liquid silicone rubber or silicone rubber gel, is added through the tubes 530 to the space defined by first mold 510 and second mold 520. In some embodiments, the volume of the silicone material added is adjusted to a desired level, so that first lens 410 is mechanically coupled to silicone material 420. In some embodiments, first lens 410 is partially embedded in silicone material 420. The silicone material is then cured by methods known in the art. In some embodiments, curing the silicone material includes vulcanizing and/or catalyzing. In some embodiments, curing the silicone material includes applying heat to the silicone material. In some embodiments, curing the silicone material includes applying pressure to the silicone material.

Figure 5D:
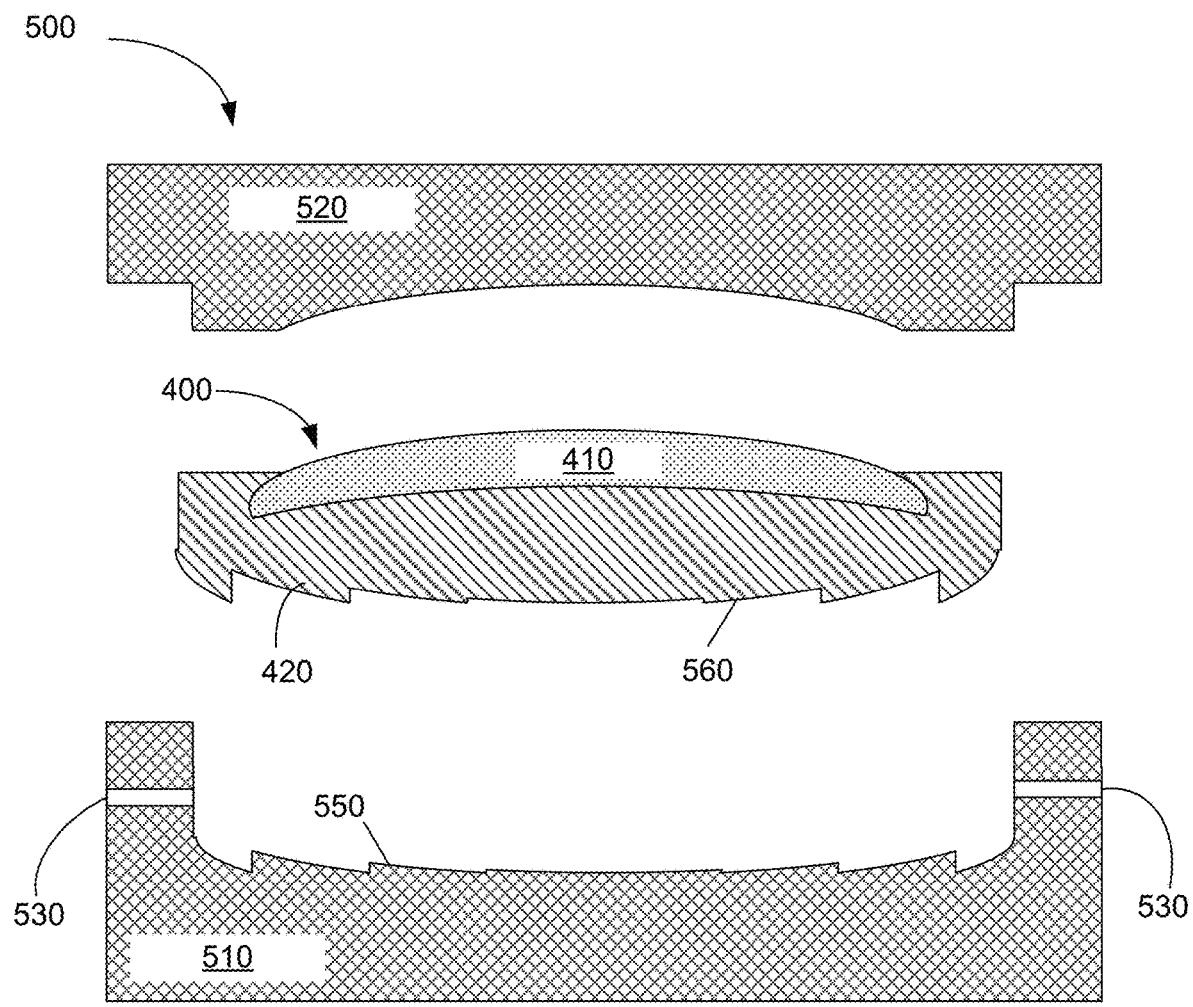
FIG. 5D is a schematic diagram illustrating a cross-sectional view of the molding system of FIG. 5A with a hybrid Fresnel lens separated from the molding system.

FIG. 5D shows the step of separating hybrid Fresnel lens 400 from mold system 500 after curing silicone material 420. Mold system 500 is transferred to an open configuration and hybrid Fresnel lens 400 is separated from mold system 500 by detaching first lens 410 from second mold 520 and by detaching silicone material 420 from first mold 510. Hybrid Fresnel lens 400 includes first lens 410 and silicone material 420 which has second Fresnel pattern 560, defined by the surface profile of first Fresnel pattern 550. In some embodiments, second Fresnel pattern 560 has a planar baseline (e.g., FIG. 4A). In some embodiments, second Fresnel pattern 560 has a convex baseline (e.g., FIG. 4C).

The method shown in FIGS. 5A-5D allows for a faster processing cycle time and results in a Fresnel lens with improved optical performance. As discussed above, a conventional PMMA lens requires a high pressure injection molding. Such high pressure molding has an increased defect rate as well as a longer cycle time (e.g., 6-10 min cycle time) compared to the insertion molding method discussed above with approximately 2 min cycle time. Also, the silicone Fresnel pattern has an improved optical performance, as discussed above.

Figure 6A:
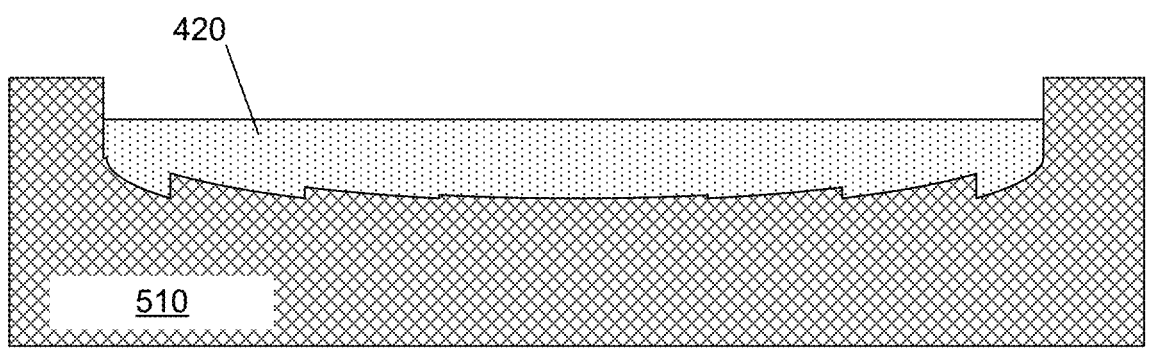
FIG. 6A is a schematic diagram illustrating a cross-sectional view of a mold for making a hybrid Fresnel lens with an alternative method in accordance with some embodiments.
Figure 6B:
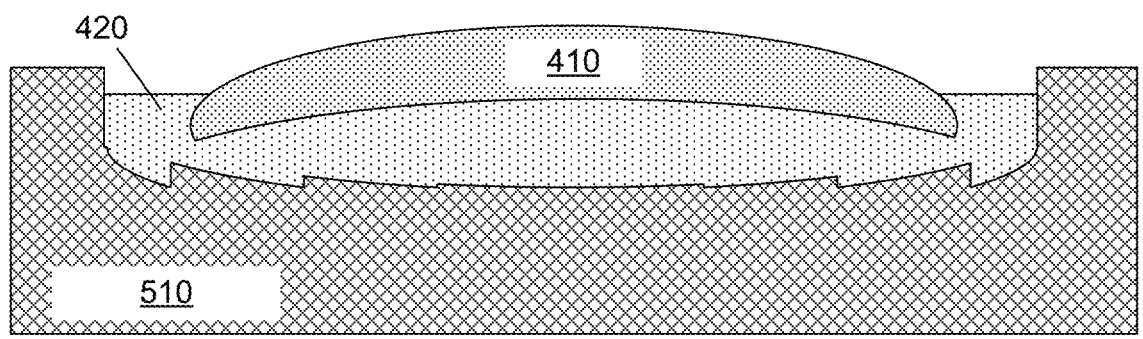
FIG. 6B is a schematic diagram illustrating a cross-sectional view of the mold of FIG. 6A during curing process of silicone material.
Figure 6C:
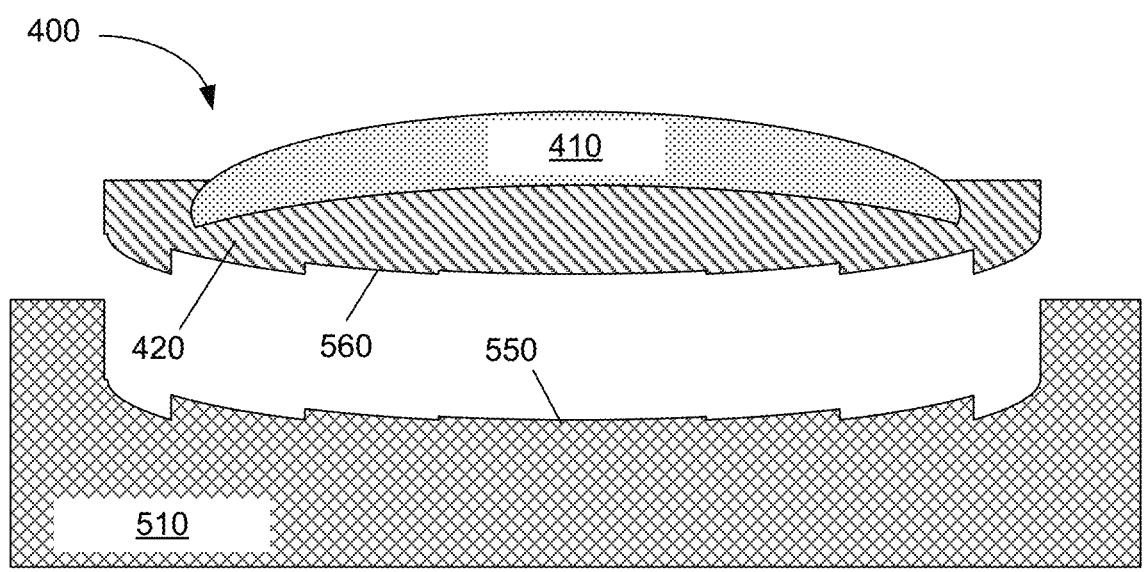
FIG. 6C is a schematic diagram illustrating a cross-sectional view of the mold of FIG. 6A with a hybrid Fresnel lens separated from the molding system.

An alternative method for making a hybrid Fresnel lens is illustrated in FIGS. 6A to 6C. In FIG. 6A, first mold 510 is filled with silicone material 420, (e.g., with liquid silicone rubber or silicone rubber gel). Volume of the silicone material is adjusted to a desired level. In FIG. 6B, first lens 410 is partially embedded in silicone material 420 so that the first lens 410 is mechanically coupled to silicone material 420 once silicone material 420 is cured. First lens 410 may be held and moved by any means known in the art that allows attachment and separation of the lens to and from its holder. Silicone material 420 is cured by the means known in the art and as described above. FIG. 6C demonstrates the step of separating hybrid Fresnel lens 400 from first mold 510. Hybrid Fresnel lens 400 includes first lens 410 and silicone material 420 which has second Fresnel pattern 560, defined by the surface profile of first Fresnel pattern 550.

In light of these principles, we now turn to certain embodiments of a hybrid Fresnel lens.

In accordance with some embodiments, a hybrid Fresnel lens includes a first lens mechanically coupled with a cured silicone material. The cured silicone material has a Fresnel pattern on a surface that faces away from the first lens. For example, in FIG. 4A, a hybrid Fresnel lens 400 has a first lens 410 mechanically coupled to a cured silicone material 420 which has a Fresnel pattern 422 on the surface facing away from the first lens. In some embodiments, the first lens is partially embedded in the cured silicone material (e.g., in FIG. 4A the first lens 410 is embedded in the cured silicone material 420).

In some embodiments, the first lens has one or more convex surfaces and a first convex surface of the one or more convex surfaces faces away from the cured silicone material. For example, in FIG. 4A the first lens 410 is a convex-concave lens where convex surface 412 is facing away from cured silicone material 420. In FIG. 4D, first lens 442 is a convex-convex lens with convex surface 412 facing away from cured silicone material 420. In FIG. 4E, first lens 452 is a plano-convex lens with convex surface 412 facing away from cured silicone material 420.

In some embodiments, the first lens has one or more concave surfaces. A first concave surface of the one or more concave surfaces faces away from the silicone material (e.g., in FIG. 4F, first lens 462 is a concave-convex lens with concave surface 464 is facing away from cured silicone material 420).

In some embodiments, the first lens has a planar surface. The planar surface faces away from the silicone material (e.g., in FIG. 4G, the first lens is a plano-convex first lens 472 wherein planar surface 474 is facing away from cured silicone material 420).

In some embodiments, the Fresnel pattern of the cured silicone is defined by a surface profile function, and a derivative of the surface profile function has one or more discontinuities (e.g., in FIG. 4B, the discontinuity of the derivative of the surface profile function is demonstrated between sections 424, 426 and 428 of Fresnel pattern 422).

In some embodiments, the hybrid Fresnel lens is rotationally symmetric (e.g., in FIG. 4H, the first hybrid Fresnel lens 400 has a rotational symmetry). For example, the hybrid Fresnel lens is a circular lens. In some embodiments, the hybrid Fresnel lens is a cylindrical lens.

In accordance with some embodiments, a method of making a hybrid Fresnel lens includes providing, in a mold having a first Fresnel pattern (e.g., in FIG. 5C, first mold 510 has first Fresnel pattern 550), a first lens (e.g., first lens 410 in FIG. 5C) and silicone material (e.g., silicone material 420 in FIG. 5C) and curing the silicone material in the mold to form a hybrid Fresnel lens (e.g., hybrid Fresnel lens 400 in FIG. 5D). The cured silicone material is mechanically coupled with the first lens and the cured silicone material has a second Fresnel pattern that corresponds to the first Fresnel pattern (e.g., in FIG. 5D, the hybrid Fresnel lens has cured silicone material 420 with second Fresnel pattern 560 corresponding to first Fresnel pattern 550).

In some embodiments, the method also includes a step of separating the hybrid Fresnel lens from the mold (e.g., in FIG. 5D, the first hybrid Fresnel lens is separated from first mold 510 and second mold 520).

In some embodiments, the silicone material provided in the mold is a liquid silicone rubber. In some embodiments, the silicone rubber provided in the mold is silicone rubber gel.

In some embodiments, the first lens has one or more convex surfaces and the first lens is placed in the mold in such a way that a first convex surface of the one or more convex surfaces faces away from the silicone material (e.g., see FIG. 5C).

In some embodiments, the first lens the first lens is a plano-convex lens, a convex-concave lens, or a convex-convex lens (e.g., examples of hybrid lenses that can be made by the method described herein are illustrated in FIGS. 4A to 4H).

In some embodiments, 90% or more of the first convex surface is exposed from the cured silicone material. In some embodiments, 80% of more of the first convex surface is not covered by the cured silicone material. In some embodiments, 70% of more of the first convex surface is not covered by the cured silicone material. In some embodiments, 60% of more of the first convex surface is not covered by the cured silicone material. In some embodiments, 50% of more of the first convex surface is not covered by the cured silicone material. In some embodiments, 95% of more of the first convex surface is not covered by the cured silicone material. In some embodiments, 99% of more of the first convex surface is not covered by the cured silicone material.

In some embodiments, a respective Fresnel pattern (e.g., the first Fresnel pattern and/or the second Fresnel pattern) is defined by a surface profile function and a derivative of the surface profile function has one or more discontinuities (e.g., see FIG. 4B).

In some embodiments, the hybrid Fresnel lens is rotationally symmetric (e.g., see FIG. 4F).

In accordance with some embodiments, a hybrid Fresnel lens is made by a process described herein. In some embodiments, the process includes the steps of providing, in a mold having a first Fresnel pattern (e.g., in FIG. 5C, first mold 510 with first Fresnel pattern 550), a first lens (e.g., first lens 410 in FIG. 5C) and silicone material (e.g., silicone material 420 in FIG. 5C) and curing the silicone material in the mold to form a hybrid Fresnel lens (e.g., hybrid Fresnel lens 400 in FIG. 5D). The cured silicone material is mechanically coupled with the first lens and the cured silicone material has a second Fresnel pattern that corresponds to the first Fresnel pattern (e.g., the first hybrid Fresnel lens with the second Fresnel pattern 560 corresponding to first Fresnel pattern 550).

In some embodiments, the hybrid Fresnel lens is made by a process that includes a step of separating the hybrid Fresnel lens from the mold (e.g., in FIG. 5D, the first hybrid Fresnel lens is separated from first mold 510 and second mold 520).

In some embodiments, the silicone material provided in the mold is a liquid silicone rubber. In some embodiment, the silicone material is silicone rubber gel.

In some embodiments, the first lens has one or more convex surfaces and the first lens is placed in the mold in such a way that a first convex surface of the one or more convex surfaces faces away from the silicone material (e.g., see FIG. 5C).

In some embodiments, the first lens has a shape of a plano-convex lens, a convex-concave lens, or a convex-convex lens (e.g., examples of different hybrid lenses that can be made by the method described above are illustrated in FIGS. 4A to 4H).

In some embodiments, the hybrid Fresnel lens made by the described process has 90% or more of the first convex surface exposed from the cured silicone material.

In some embodiments, the hybrid Fresnel lens made by the described process has a respective Fresnel pattern (e.g., the first Fresnel pattern and/or the second Fresnel pattern) defined by a surface profile function and a derivative of the surface profile function has one or more discontinuities (e.g., see FIG. 4B).

In some embodiments, the hybrid Fresnel lens made by the described process is rotationally symmetric (e.g., see FIG. 4F).

In some embodiments, a display device includes a hybrid Fresnel lens (e.g., a hybrid Fresnel lens described herein) and an array of light emitting devices coupled with the hybrid Fresnel lens for outputting light through the hybrid Fresnel lens. In some embodiments, the display device is a head-mounted display device.

FIGS. 7A to 7D show lenses of a lens assembly in accordance with some embodiments.

Figure 7A:
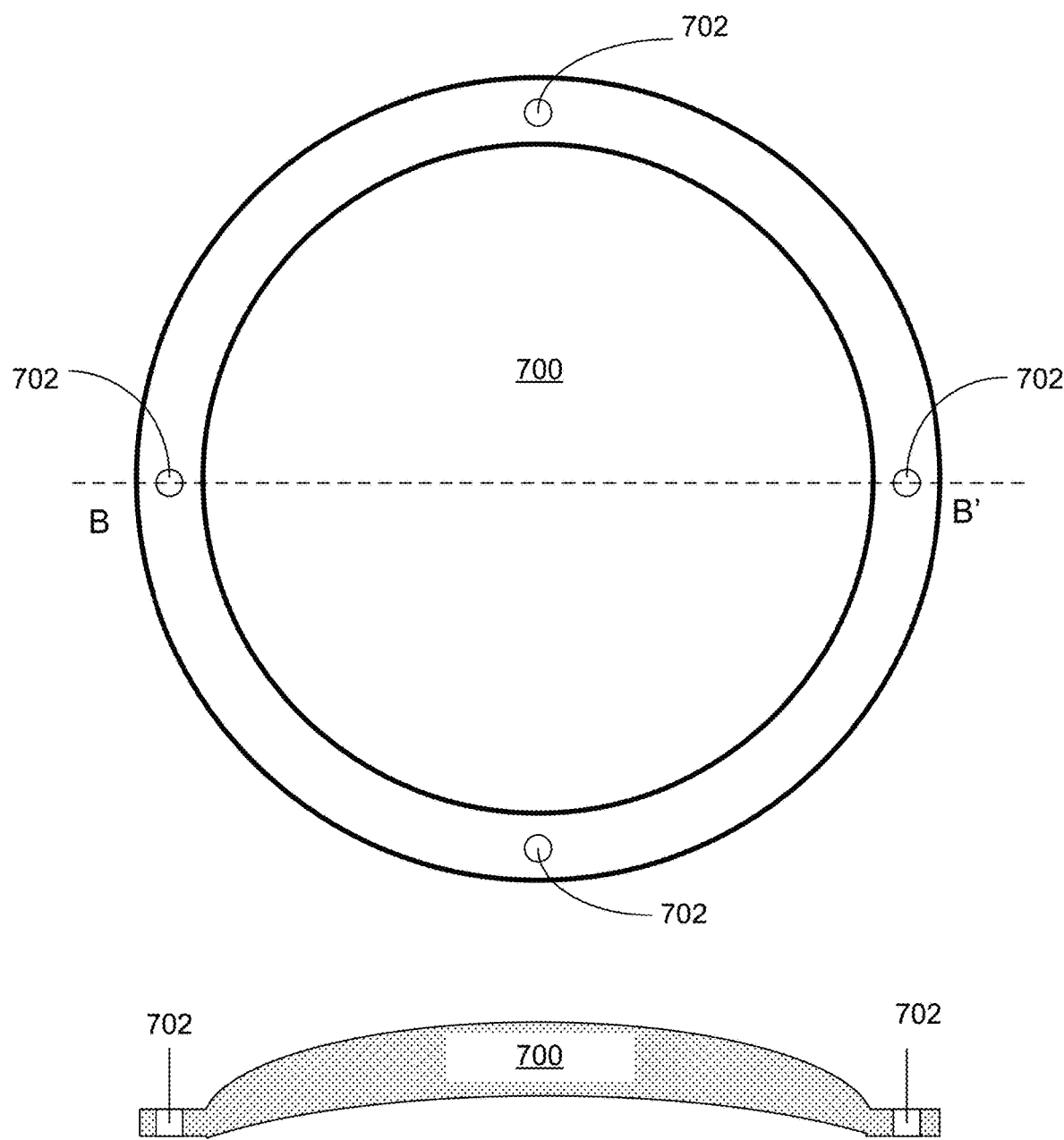
FIG. 7A is a schematic diagram illustrating a plan view and a cross-sectional view of a first lens of a lens assembly in accordance with some embodiments.

FIG. 7A is a schematic diagram illustrating a plan view and a cross-sectional view of first lens 700 of a lens assembly. Line BB' on the plan view represents a plane upon which the cross-sectional view is taken.

In some embodiments, first lens 700 is a convex-concave lens as shown in FIG. 7A. In some embodiments, first lens 700 is a plano-convex lens, a plano-concave lens, a convex-convex lens, or a concave-concave lens. In some embodiments, first lens 700 is a spherical lens or an aspheric lens, such as a parabolic lens.

In FIG. 7A, first lens 700 has a plurality of through-holes 702 (e.g., the plurality of through-holes 702 is defined in first lens 700). In some embodiments, the plurality of through-holes 702 is positioned in proximity of the edge of first lens 700 for enabling slidable coupling of first lens 700 to a second lens of the lens assembly (e.g., second lens 710 shown in FIG. 7B). In FIG. 7A, four through-holes 700 are defined in first lens 700. In some embodiments, more or fewer through-holes (e.g., 2, 3, 5, 6, or 7 through-holes) are defined in first lens 700. In some embodiments, first lens 700 includes a peripheral region that includes a first planar surface (e.g., a flat surface) and a second planar surface that is opposite to the first planar surface. In some embodiments, the plurality of through-holes 702 is defined in the peripheral region of first lens 700.

In some embodiments, first lens 410 is made of a material including polymethylmethacrylate (PMMA, also known as acrylic). In some embodiments, the first lens is made of PMMA.

Figure 7B:
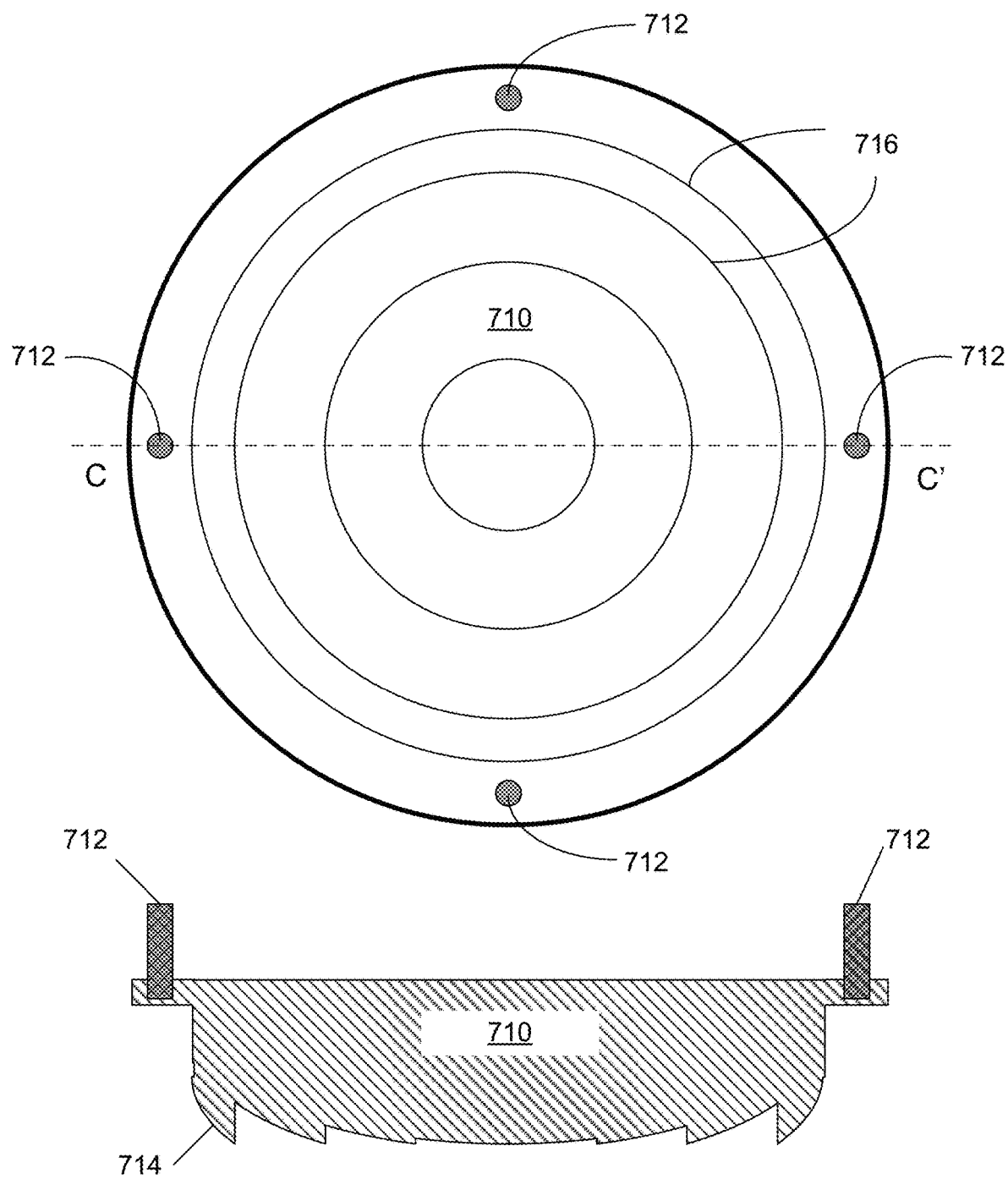
FIG. 7B is a schematic diagram illustrating a plan view and a cross-sectional view of a second lens of a lens assembly in accordance with some embodiments.

FIG. 7B is a schematic diagram illustrating a plan view and a cross-sectional view of second lens 710. Line CC' on the plan view represents a plane upon which the cross-sectional view is taken.

Second lens 710 is made of a material including cured silicone material. In some embodiments, the silicone material includes silicone (e.g. polysiloxanes). In some embodiments, the silicone material also includes one or more fillers.

Second lens 710 is associated with a plurality of guides 712 (e.g. pins). In some embodiments, second lens 710 includes the plurality of guides 712 (e.g., second lens, including the plurality of guides 712, is integrally made in a single molding process). In some embodiments, second lens 710 is mechanically coupled with the plurality of guides 712. In some embodiments, the plurality of guides 712 is made of the same material as second lens 710. In some embodiments, the plurality of guides 712 is made of a material that is distinct from the material of second lens 710. In some embodiments, the plurality of guides 712 is positioned in proximity of the edge of the lens. In FIG. 7B, four guides 712 are shown. In some embodiments, more or fewer guides (e.g., 2, 3, 5, 6, or 7 guides) are associated with second lens 710 (e.g., second lens 710 includes more or fewer guides).

In some embodiments, through-holes 702 of first lens 700 shown in FIG. 7A are positioned to mate with guides 712 of second lens 710 (e.g., guides 712 of second lens 710 are positioned to mate with through-holes 702 of first lens 700). In some embodiments, first lens 700 and second lens 710 are slidably coupled (e.g., one of first lens 700 and second lens 710 is configured to move relative to the other of first lens 700 and second lens 710, thereby enabling adjustment of a distance or spacing between first lens 700 and second lens 710).

Second lens 710 has surface 714 with a Fresnel pattern. In some embodiments, surface 714 of second lens 710 is opposite to the surface from which guides 712 protrude, as shown in FIG. 7B. In some embodiments, the Fresnel pattern of second lens 710 has a planar baseline. Alternatively, the Fresnel pattern of second lens 710 has a convex baseline (similar to Fresnel pattern shown in FIG. 4C). In some embodiments, the Fresnel pattern is defined by a surface profile function and a derivative of the surface profile function has one or more discontinuities (see FIGS. 4A and 4B). Thin circular lines 716 of the plan view represent the junctions of the Fresnel pattern on surface 714, which are visible from the surface opposite to surface 714 (e.g., the surface from which guides 712 protrude) when second lens 710 is made of a transparent or translucent material (e.g., silicone material). The junctions of the Fresnel pattern correspond to the discontinuities in the derivative of the surface profile function.

Figure 7C:
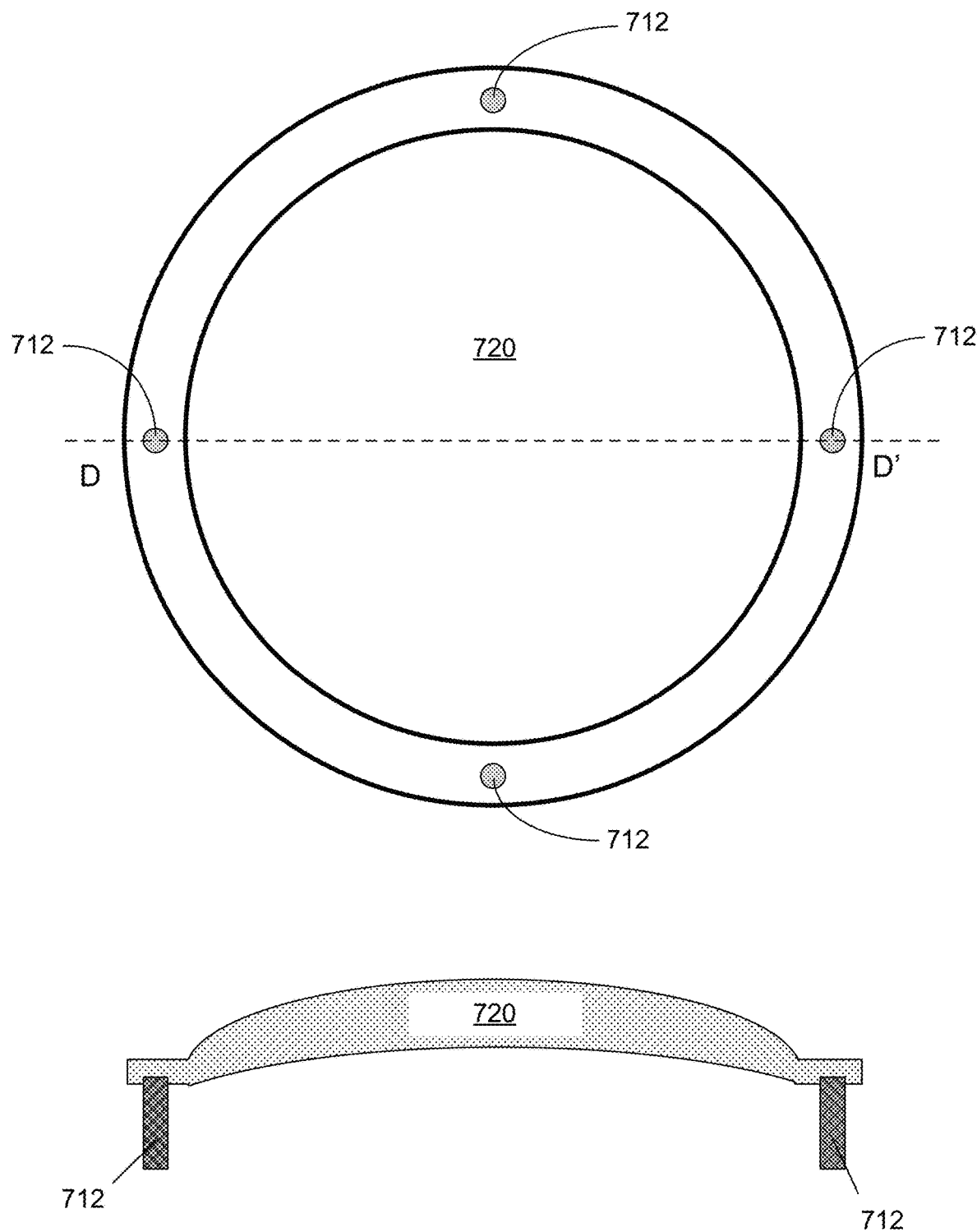
FIG. 7C is a schematic diagram illustrating a plan view and a cross-sectional view of a first lens of a lens assembly in accordance with some embodiments.
Figure 7D:
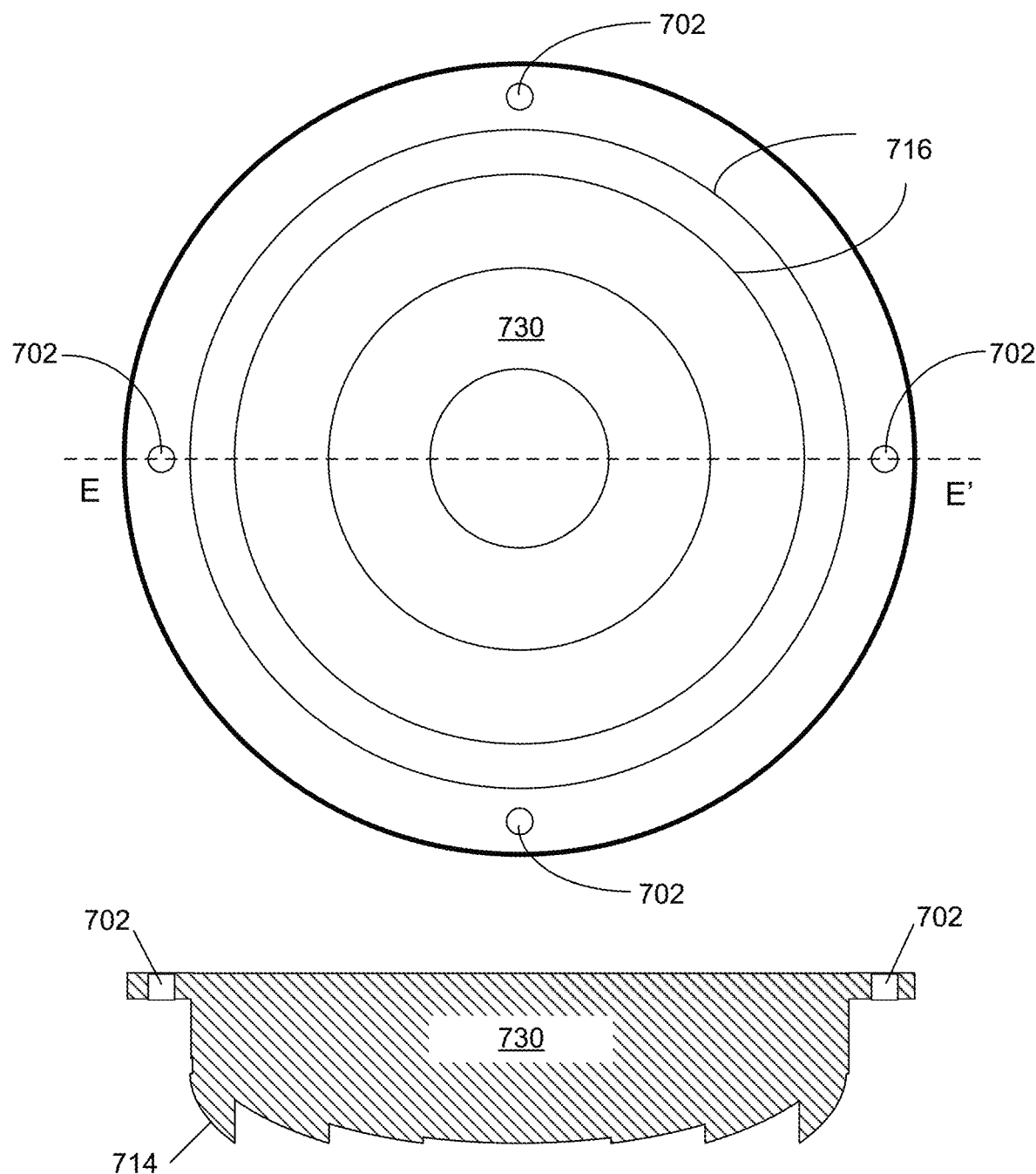
FIG. 7D is a schematic diagram illustrating a plan view and a cross-sectional view of a second lens of a lens assembly in accordance with some embodiments.

FIG. 7C shows first lens 720 with a plurality of guides 712, and FIG. 7D shows second lens 730 with a plurality of through-holes 702. Again, through-holes 702 and guides 712 are positioned to mate with each other and enable slidable coupling of first lens 720 and second lens 730.

Figure 8A:
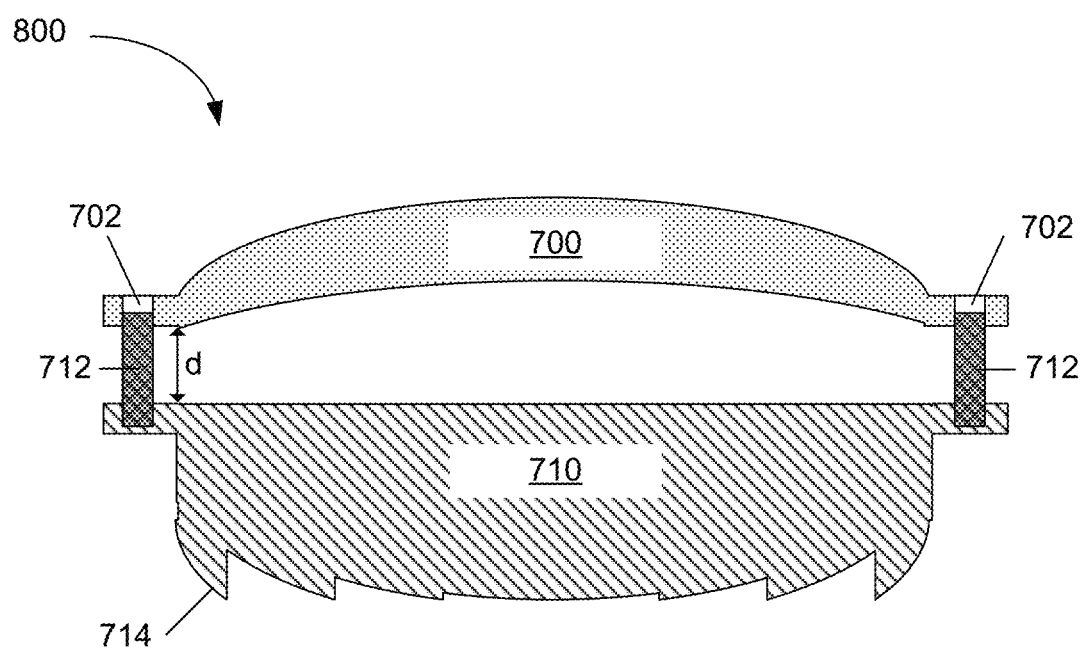
FIG. 8A is a schematic diagram illustrating a cross-sectional view of a lens assembly in accordance with some embodiments.

FIG. 8A is a schematic diagram illustrating lens assembly 800 in accordance with some embodiments. In FIG. 8A, first lens 700 and second lens 710 are slidably coupled to each other. Guides 712 of second lens 710 are at least partially inserted in through-holes 702 of first lens 700. Lenses 700 and 710 are centered with respect to each other and have a particular distance d between first lens 700 and second lens 710. The distance d is adjusted by moving the lenses slidably in respect to each other (e.g., moving first lens 700 with respect to second lens 710, moving second lens 710 with respect to first lens 700, or moving both first lens 700 and second lens 710), thereby providing a particular magnification for lens assembly 800.

Figure 8B:
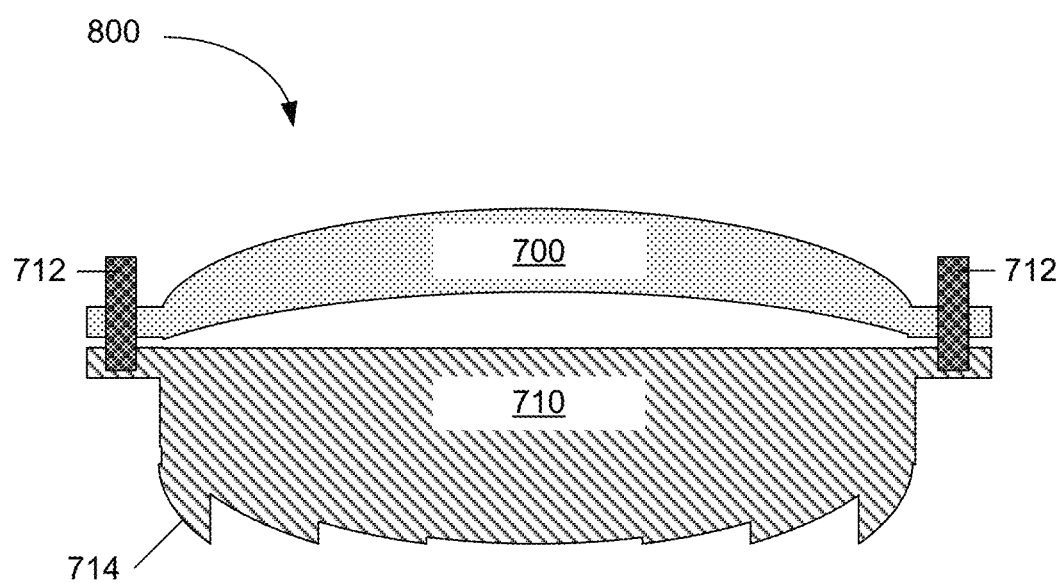
FIG. 8B is a schematic diagram illustrating a cross-sectional view of a lens assembly in accordance with some embodiments.

FIG. 8B is a schematic diagram illustrating lens assembly 800 in a configuration where first lens 700 and second lens 710 are positioned in a close proximity to each other (e.g., the distance d between first lens 700 and second lens 710 is reduced).

Figure 9A:
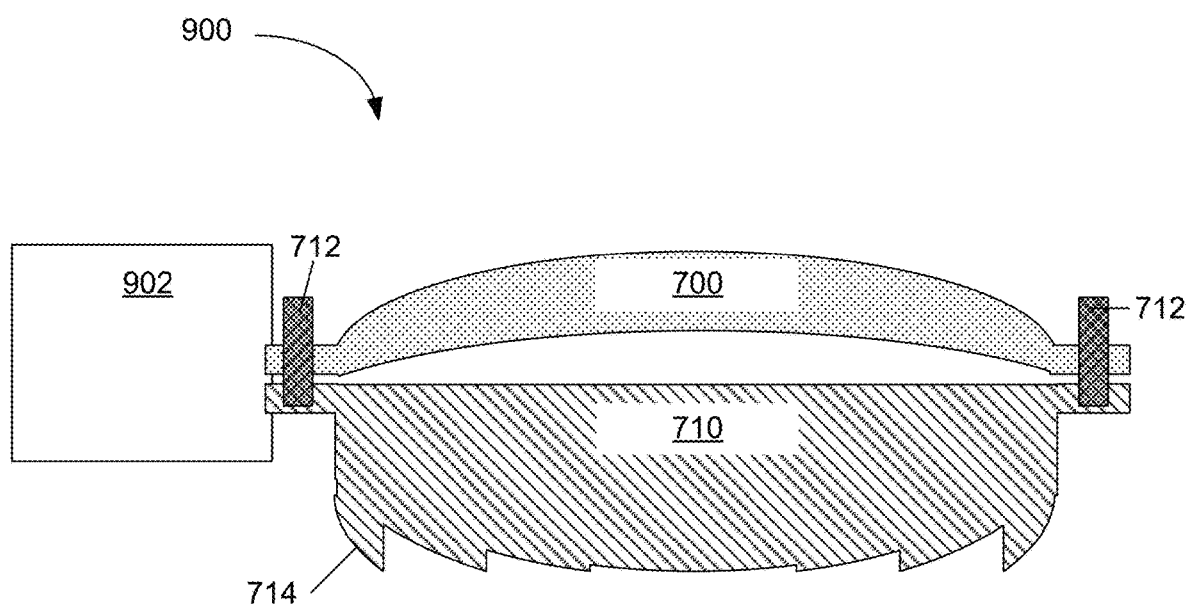
FIG. 9A is a schematic diagram illustrating a cross-sectional view of a lens assembly with an actuator in accordance with some embodiments.

In some embodiments, the distance d between first lens 700 and second lens 710 is changed by an actuator that is configured to move first lens 700 and/or second lens 710. FIG. 9A shows lens assembly 900 with actuator 902. In FIG. 9A, first lens 700 and second lens 710 are located in close proximity to each other. In some embodiments, actuator 902 is mechanically coupled to first lens 700 (optionally, without being mechanically coupled to second lens 710). In some embodiments, actuator 902 is mechanically coupled to second lens 700 (optionally, without being mechanically coupled to first lens 700). In some embodiments, actuator 902 is mechanically coupled to first lens 700 and second lens 710. In some embodiments, actuator 902 includes an electric motor for moving one or more of lenses 700 and 710. In some embodiments, actuator 902 includes a linear motor. In some embodiments, actuator 902 includes a rotational motor coupled with a rack and pinion. In some embodiments, actuator 902 includes a rotational motor coupled with a linear screw actuator.

Figure 9B:
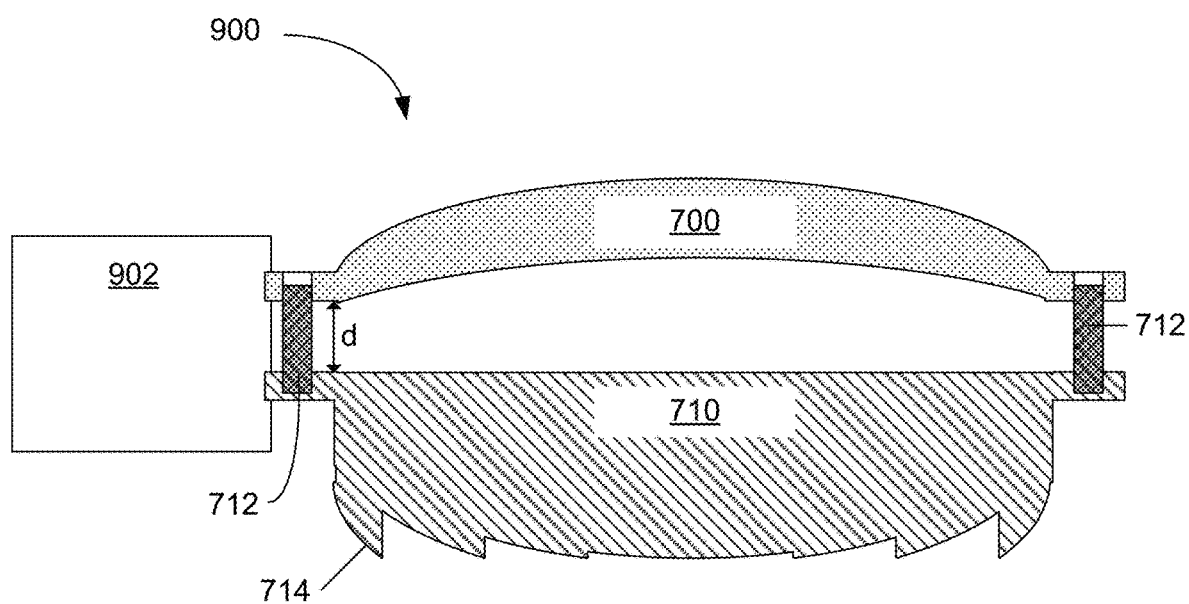
FIG. 9B is a schematic diagram illustrating a cross-sectional view of a lens assembly with an actuator in accordance with some embodiments.

In some embodiments, one or more of lenses 700 and 710 are moved manually. In some embodiments, actuator 902 includes a handle coupled with a rack and pinion and/or a linear screw actuator for manually moving one or more of lenses 700 and 710. FIG. 9B shows lens assembly 900 in configuration where there first lens and second lens are slidably moved by actuator 902 to have a particular distance d between each other.

In some embodiments, the sliding motion of the first lens relative to the second lens (or the sliding motion of the second lens relative to the first lens) is in a direction that is substantially parallel to an optical axis of the first lens or the second lens. For example, the sliding motion of the first lens and/or the second lens is in a direction that is within 1, 3, 5, 10, 15, 20, 25, 30, or 35 degrees from an optical axis of the first lens. In some embodiments, the optical axis of the first lens is substantially parallel to an optical axis of the second lens (e.g., the optical axis of the first lens is within 1, 3, 5, 10, 15, 20, 25, 30, or 35 degrees from the optical axis of the second lens).

Figure 10:
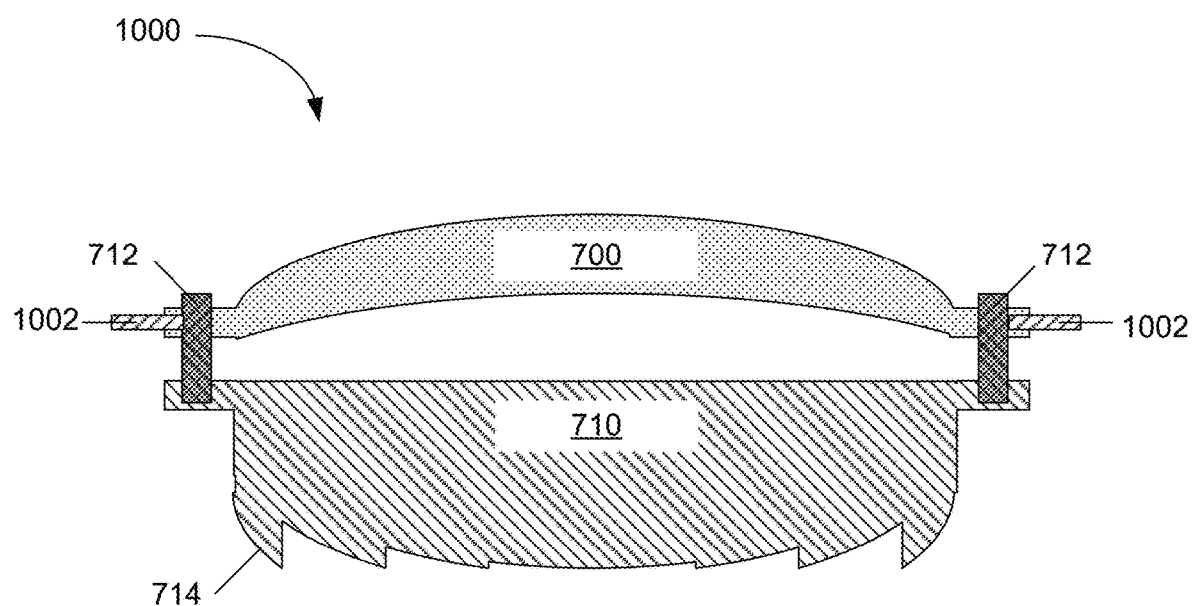
FIG. 10 is a schematic diagram illustrating a cross-sectional view of a lens assembly with locks in accordance with some embodiments.

In some embodiments, the sliding motion of the second lens relative to the first lens is prevented, prohibited, or hindered by one or more locks. The one or more locks prevent, prohibit, or hinder the sliding motion of the second lens relative to the first lens by increasing a friction in the sliding motion or mechanically locking the second lens relative to the first lens. FIG. 10 shows lens assembly 1000 with two locks 1002 (e.g. locking screws). In some embodiments, more or fewer locks are used (e.g., 1, 3, 4, 5, 6, or 7 locks). In some embodiments, each through-hole is coupled with a respective lock.

In FIG. 10, locks 1002 (e.g., locking screws) are positioned in thread holes of first lens 700. This allows movement of locks 1002 toward, or away from, guides 712, thereby enabling the locking mechanism. In some embodiments, the thread holes are located on a side of first lens 700 (e.g., along the peripheral region of first lens 700).

Lens assemblies illustrated in FIGS. 7A-7D, 8A-8B, 9A-9B, and 10 include convex-concave shaped first lens 700 with through-holes 702 and second lens 710 with guides 712. In some embodiments, a lens assembly includes a first lens of a different shape (e.g., a plano-convex lens, a plano-concave lens, a convex-convex lens, or a concave-concave lens, a spherical lens, an aspheric lens). In some embodiments, the lens assembly includes a second lens of a different shape (e.g., a lens having a first surface with a Fresnel pattern having a planar baseline, a convex baseline, or a concave baseline, and a second surface that is a planar surface, a non-Fresnel convex surface, a non-Fresnel concave surface, or a Fresnel surface).

In light of these principles, we now turn to certain embodiments of a lens assembly.

In accordance with some embodiments, a lens assembly includes a first lens and a second lens that includes silicone material and has a surface with a Fresnel pattern (e.g., in FIG. 8A, lens assembly 800 includes first lens 700 and second lens 710 having surface 714 with a Fresnel pattern). The second lens is slidably coupled with the first lens (e.g., in FIG. 8A, second lens 710 is slidably coupled with first lens 700 so that second lens 710 can move relative to first lens 700 while maintaining a contact between first lens 700 and second lens 710).

In some embodiments, the first lens is a plano-convex lens, a convex-concave lens (e.g., in FIG. 7A), a plano-concave lens, a convex-convex lens, a concave-concave lens. In some embodiments, the first lens is a spherical lens or an aspheric lens, such as a parabolic lens.

In some embodiments, the first lens includes polymethylmethacrylate (PMMA). In some embodiments, the first lens is made of a material that includes PMMA. In some embodiments, the first lens is made of PMMA.

In some embodiments, the second lens is made of a material that includes the silicone material. In some embodiments, the second lens is made of the silicone material. In some embodiments, the silicone material includes silicone (e.g., polysiloxanes). In some embodiments, the silicone material also includes one or more fillers.

In some embodiments, the second lens includes a plurality of guides that are slidably coupled with the first lens. In some embodiments, the guides are pins.

In some embodiments, a plurality of through-holes is defined in the first lens, and the plurality of through-holes is configured to mate with the plurality of guides. For example, first lens 700 in FIG. 7A has a plurality of through-holes 702 and second lens 710 in FIG. 7B has a plurality of guides 712, and the plurality of guides 712 is positioned and angled to mate with the plurality of through-holes 702. Lens assembly 800 of FIG. 8A, for example, shows second lens 710 slidably coupled with first lens 700 so that through-holes 702 mate with guides 712 of second lens 710.

In some embodiments, the lens assembly further includes a lock configured for conditionally preventing a sliding motion of the second lens relative to the first lens (e.g., in FIG. 10, lens assembly 1000 has lock 1002). For example, the lock prevents the sliding motion of the second lens relative to the first lens while the lock is engaged, and the lock allows the sliding motion of the second lens relative to the first lens while the lock is disengaged. In some embodiments, the lock includes a locking screw.

In some embodiments, the first lens includes a plurality of guides that are slidably coupled with the second lens (e.g., FIG. 7C). In some embodiments, the guides are pins. In some embodiments, a plurality of through-holes are defined in the second lens and the plurality of through-holes are configured to mate with the plurality of guides (e.g., FIG. 7D).

In some embodiments, the lens assembly further includes an actuator configured to move the first lens and/or the second lens so as to change a distance between the first lens and the second lens (e.g., lens assembly 900 has actuator 902 which moves first lens 700 and/or second lens 710 to change the distance between them, as shown in FIGS. 9A and 9B). In some embodiments, the lens assembly is coupled with an actuator configured to move the first lens and/or the second lens so as to change a distance between the first lens and the second lens (e.g., the actuator is not part of the lens assembly).

In some embodiments, the first lens and the second lens of the lens assembly are rotationally symmetric (e.g., FIGS. 7A and 7B). In some embodiments, the first lens and the second lens of the lens assembly are reflectionally symmetric, but not rotationally symmetric (e.g., the first lens and the second lens are cylindrical lenses). In some embodiments, the first lens is rotationally symmetric, and the second lens is reflectionally symmetric but not rotationally symmetric. In some embodiments, the second lens is rotationally symmetric, and the first lens is reflectionally symmetric but not rotationally symmetric.

In some embodiments, the Fresnel pattern of the second lens is defined by a surface profile function and a derivative of the surface profile function has one or more discontinuities (e.g., FIG. 4B).

In accordance with some embodiments, a lens assembly is made by a method including providing a first lens, providing a second lens that includes silicone material and has a Fresnel pattern, and slidably coupling the first lens with the second lens (e.g., inserting guides of one lens into through-holes of the other lens).

In some embodiments, the method of making the lens assembly further includes mechanically coupling the first lens and/or the second lens with an actuator configured to change a distance between the first lens and the second lens. In some embodiments, the actuator includes an electronic motor for moving the lenses. In some embodiments, the actuator includes a linear motor. In some embodiments, the actuator includes a rotational motor coupled with a rack and pinion. In some embodiments, the lenses are moved manually. In some embodiments, the actuator has a handle coupled with a rack and pinion for manually moving the lenses.

In some embodiments, the method of making the lens assembly further includes changing a distance between the first lens and the second lens to obtain a particular magnification for the lens assembly (e.g., FIGS. 8A and 8B).

In some embodiments, the method of making the lens assembly further includes fixing the distance between the first lens and the second lens.

In some embodiments, the first lens and the second lens are slidably coupled with a plurality of guides and a plurality of corresponding through-holes. Fixing the distance between the first lens and the second lens includes engaging a lock (e.g. turning a locking screw) to prevent a sliding motion of at least one guide of the plurality of guides relative to a corresponding through-hole of the plurality of through-holes. In some embodiments, fixing the distance between the first lens and the second lens includes engaging multiple locks.

In some embodiments, the second lens is made by providing, in a mold having a first Fresnel pattern, silicone material, and curing the silicone material in the mold to form a Fresnel lens. The cured silicone material has a second Fresnel pattern that corresponds to the first Fresnel pattern. This is similar to the methods for making a hybrid Fresnel lens, described in FIGS. 5C and 6B, without coupling of first lens 410.

In accordance with some embodiments, a display device includes a lens assembly (e.g., a lens assembly described herein) and an array of light emitting devices coupled with the lens assembly for outputting light through the lens assembly. For example, FIG. 3 shows a display device 300 with light emission device array 310 and one or more lenses 330 (e.g., a lens assembly).

In some embodiments, the display device is a head-mounted display device (e.g., FIG. 1).

In some embodiments, the array of light emitting devices is configured to output light and transmit the light through the lens assembly toward an eye of a user when the display device is worn on a head of the user (e.g., FIG. 1).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A hybrid Fresnel lens, comprising:
a first lens having two opposing optical surfaces, the first lens being partially embedded in a cured silicone material so that the two opposing optical surfaces are in contact with the cured silicone material and the first lens is mechanically coupled with the cured silicone material, wherein the cured silicone material has a Fresnel pattern on a surface that faces away from the first lens.

2. The hybrid Fresnel lens of claim 1, wherein:
the first lens has one or more convex surfaces; and
a first convex surface of the one or more convex surfaces faces away from the cured silicone material.

3. The hybrid Fresnel lens of claim 2, wherein:
the first lens is one of: a plano-convex lens, a convex-concave lens, and a convex-convex lens.

4. The hybrid Fresnel lens of claim 2, wherein:
90% or more of the first convex surface is exposed from the cured silicone material.

5. The hybrid Fresnel lens of claim 1, wherein:
the Fresnel pattern is defined by a surface profile function; and
a derivative of the surface profile function has one or more discontinuities.

6. The hybrid Fresnel lens of claim 1, wherein:
the hybrid Fresnel lens is rotationally symmetric.

7. The hybrid Fresnel lens of claim 1, wherein:
at least a portion of a first optical surface of the two opposing optical surfaces and a portion, less than all, of a second optical surface of the two opposing optical surfaces are in contact with the cured silicone material.

8. The hybrid Fresnel lens of claim 1, wherein:
the Fresnel pattern has a baseline that is different from a contour of an optical surface of the two opposing surfaces of the first lens facing the cured silicone material.

9. The hybrid Fresnel lens of claim 8, wherein:
the baseline of the Fresnel pattern has a convex shape.

* * * * *